(12) United States Patent
Muller

(10) Patent No.: US 10,379,598 B2
(45) Date of Patent: Aug. 13, 2019

(54) POWER MANAGEMENT OF DATA PROCESSING RESOURCES, SUCH AS POWER ADAPTIVE MANAGEMENT OF DATA STORAGE OPERATIONS

(71) Applicant: CommVault Systems, Inc., Tinton Falls, NJ (US)

(72) Inventor: Marcus S. Muller, Granville, OH (US)

(73) Assignee: Commvault Systems, Inc., Tinton Falls, NJ (US)

( * ) Notice: Subject to any disclaimer, the term of this patent is extended or adjusted under 35 U.S.C. 154(b) by 162 days.

(21) Appl. No.: 14/667,971

(22) Filed: Mar. 25, 2015

(65) Prior Publication Data

US 2015/0198995 A1 Jul. 16, 2015

Related U.S. Application Data

(62) Division of application No. 14/138,473, filed on Dec. 23, 2013, now Pat. No. 9,021,282, which is a division
(Continued)

(51) Int. Cl.
*G06F 3/06* (2006.01)
*G06F 1/329* (2019.01)
(Continued)

(52) U.S. Cl.
CPC ............ *G06F 1/329* (2013.01); *G06F 1/3221* (2013.01); *G06F 1/3234* (2013.01);
(Continued)

(58) Field of Classification Search
CPC ...... G06F 1/329; G06F 1/3221; G06F 1/3234; G06F 1/3268; G06F 1/3275;
(Continued)

(56) References Cited

U.S. PATENT DOCUMENTS

| | | |
|---|---|---|
| 4,686,620 A | 8/1987 | Ng |
| 4,995,035 A | 2/1991 | Cole et al. |

(Continued)

FOREIGN PATENT DOCUMENTS

| | | |
|---|---|---|
| CN | 1259733 A | 7/2000 |
| CN | 1525272 A | 9/2004 |

(Continued)

OTHER PUBLICATIONS

Extended European Search Report for Application No. 08798909.1, dated Mar. 21, 2016, 11 pages.
(Continued)

*Primary Examiner* — Ji H Bae
(74) *Attorney, Agent, or Firm* — Perkins Coie LLP

(57) ABSTRACT

A system and method for performing power conservation actions is described. In some examples, the system determines a power conservation policy based on information from the system, and implements that policy in an enterprise or in one or more buildings, such as within a data storage environment. In some examples, the system adds or modifies global filters or system performance based on information from the system.

16 Claims, 16 Drawing Sheets

Related U.S. Application Data of application No. 12/671,794, filed as application No. PCT/US2008/074686 on Aug. 28, 2008, now Pat. No. 8,707,070.

(60) Provisional application No. 60/968,500, filed on Aug. 28, 2007.

(51) Int. Cl.
*G06F 1/3221* (2019.01)
*G06F 1/3234* (2019.01)

(52) U.S. Cl.
CPC .......... *G06F 1/3268* (2013.01); *G06F 1/3275* (2013.01); *G06F 3/0625* (2013.01); *G06F 3/0634* (2013.01); *G06F 3/0635* (2013.01); *G06F 3/0685* (2013.01); *Y02D 10/154* (2018.01); *Y02D 50/20* (2018.01); *Y02P 90/82* (2015.11)

(58) Field of Classification Search
CPC .... G06F 3/0625; G06F 3/0634; G06F 3/0635; G06F 3/0685; Y02B 60/1246; Y02B 60/32
USPC ............ 713/300; 700/276; 711/114; 709/217
See application file for complete search history.

(56) References Cited

U.S. PATENT DOCUMENTS

| | | |
|---|---|---|
| 5,005,122 A | 4/1991 | Griffin et al. |
| 5,093,912 A | 3/1992 | Dong et al. |
| 5,123,107 A | 6/1992 | Mensch, Jr. |
| 5,133,065 A | 7/1992 | Cheffetz et al. |
| 5,193,154 A | 3/1993 | Kitajima et al. |
| 5,212,772 A | 5/1993 | Masters |
| 5,226,157 A | 7/1993 | Nakano et al. |
| 5,239,647 A | 8/1993 | Anglin et al. |
| 5,241,668 A | 8/1993 | Eastridge et al. |
| 5,241,670 A | 8/1993 | Eastridge et al. |
| 5,276,860 A | 1/1994 | Fortier et al. |
| 5,276,867 A | 1/1994 | Kenley et al. |
| 5,287,500 A | 2/1994 | Stoppani, Jr. |
| 5,321,816 A | 6/1994 | Rogan et al. |
| 5,333,315 A | 7/1994 | Saether et al. |
| 5,347,653 A | 9/1994 | Flynn et al. |
| 5,410,700 A | 4/1995 | Fecteau et al. |
| 5,448,724 A | 9/1995 | Hayashi |
| 5,491,810 A | 2/1996 | Allen |
| 5,495,607 A | 2/1996 | Pisello et al. |
| 5,504,873 A | 4/1996 | Martin et al. |
| 5,544,345 A | 8/1996 | Carpenter et al. |
| 5,544,347 A | 8/1996 | Yanai et al. |
| 5,559,957 A | 9/1996 | Balk |
| 5,619,644 A | 4/1997 | Crockett et al. |
| 5,638,509 A | 6/1997 | Dunphy et al. |
| 5,664,204 A | 9/1997 | Wang |
| 5,673,381 A | 9/1997 | Huai et al. |
| 5,699,361 A | 12/1997 | Ding et al. |
| 5,729,743 A | 3/1998 | Squibb |
| 5,751,997 A | 5/1998 | Kullick et al. |
| 5,758,359 A | 5/1998 | Saxon |
| 5,761,677 A | 6/1998 | Senator et al. |
| 5,764,972 A | 6/1998 | Crouse et al. |
| 5,778,395 A | 7/1998 | Whiting et al. |
| 5,812,398 A | 9/1998 | Nielsen |
| 5,813,009 A | 9/1998 | Johnson et al. |
| 5,813,017 A | 9/1998 | Morris |
| 5,875,478 A | 2/1999 | Blumenau |
| 5,887,134 A | 3/1999 | Ebrahim |
| 5,901,327 A | 5/1999 | Ofek |
| 5,924,102 A | 7/1999 | Perks |
| 5,950,205 A | 9/1999 | Aviani, Jr. |
| 5,974,563 A | 10/1999 | Beeler, Jr. |
| 6,021,415 A | 2/2000 | Cannon et al. |
| 6,026,414 A | 2/2000 | Anglin |
| 6,052,735 A | 4/2000 | Ulrich et al. |
| 6,076,148 A | 6/2000 | Kedem |
| 6,094,416 A | 7/2000 | Ying |
| 6,131,095 A | 10/2000 | Low et al. |
| 6,131,190 A | 10/2000 | Sidwell |
| 6,148,412 A | 11/2000 | Cannon et al. |
| 6,154,787 A | 11/2000 | Urevig et al. |
| 6,161,111 A | 12/2000 | Mutalik et al. |
| 6,167,402 A | 12/2000 | Yeager |
| 6,212,512 B1 | 4/2001 | Barney et al. |
| 6,260,069 B1 | 7/2001 | Anglin |
| 6,269,431 B1 | 7/2001 | Dunham |
| 6,275,953 B1 | 8/2001 | Vahalia et al. |
| 6,301,592 B1 | 10/2001 | Aoyama et al. |
| 6,324,581 B1 | 11/2001 | Xu et al. |
| 6,327,590 B1 | 12/2001 | Chidlovskii et al. |
| 6,328,766 B1 | 12/2001 | Long |
| 6,330,570 B1 | 12/2001 | Crighton |
| 6,330,642 B1 | 12/2001 | Carteau |
| 6,343,324 B1 | 1/2002 | Hubis et al. |
| RE37,601 E | 3/2002 | Eastridge et al. |
| 6,356,801 B1 | 3/2002 | Goodman et al. |
| 6,389,432 B1 | 5/2002 | Pothapragada et al. |
| 6,421,711 B1 | 7/2002 | Blumenau et al. |
| 6,487,561 B1 | 11/2002 | Ofek et al. |
| 6,519,679 B2 | 2/2003 | Devireddy et al. |
| 6,538,669 B1 | 3/2003 | Lagueux, Jr. et al. |
| 6,564,228 B1 | 5/2003 | O'Connor |
| 6,658,526 B2 | 12/2003 | Nguyen et al. |
| 6,941,429 B1 | 9/2005 | Kamvysselis et al. |
| 6,973,555 B2 | 12/2005 | Fujiwara et al. |
| 7,035,880 B1 | 4/2006 | Crescenti et al. |
| 7,079,341 B2 | 7/2006 | Kistler et al. |
| 7,107,298 B2 | 9/2006 | Prahlad et al. |
| 7,130,272 B1 | 10/2006 | Gai et al. |
| 7,143,203 B1 * | 11/2006 | Altmejd ................ G06F 1/3203 710/15 |
| 7,225,220 B2 | 5/2007 | Gonzalez et al. |
| 7,246,207 B2 | 7/2007 | Kottomtharayil et al. |
| 7,260,633 B2 | 8/2007 | Lette et al. |
| 7,334,144 B1 * | 2/2008 | Schlumberger ........ G06F 1/3221 455/574 |
| 7,340,616 B2 | 3/2008 | Rothman et al. |
| 7,343,356 B2 | 3/2008 | Prahlad et al. |
| 7,343,453 B2 | 3/2008 | Prahlad et al. |
| 7,346,751 B2 | 3/2008 | Prahlad et al. |
| 7,366,846 B2 | 4/2008 | Boyd et al. |
| 7,386,744 B2 | 6/2008 | Barr et al. |
| 7,395,282 B1 | 7/2008 | Crescenti et al. |
| 7,448,079 B2 | 11/2008 | Tremain |
| 7,472,079 B2 | 12/2008 | Fellenstein et al. |
| 7,502,820 B2 | 3/2009 | Manders et al. |
| 7,516,346 B2 | 4/2009 | Pinheiro et al. |
| 7,516,348 B1 * | 4/2009 | Ofer ..................... G06F 1/3268 365/28 |
| 7,526,798 B2 | 4/2009 | Chao et al. |
| 7,546,475 B2 | 6/2009 | Mayo et al. |
| 7,587,570 B2 | 9/2009 | Sarkar et al. |
| 7,617,191 B2 | 11/2009 | Wilbrink et al. |
| 7,627,827 B2 | 12/2009 | Taylor et al. |
| 7,631,351 B2 | 12/2009 | Erofeev |
| 7,651,593 B2 | 1/2010 | Prahlad et al. |
| 7,668,884 B2 | 2/2010 | Prahlad et al. |
| 7,694,070 B2 | 4/2010 | Mogi et al. |
| 7,739,548 B2 | 6/2010 | Goodrum et al. |
| 7,761,736 B2 | 7/2010 | Nguyen et al. |
| 7,765,167 B2 | 7/2010 | Prahlad et al. |
| 7,769,616 B2 | 8/2010 | Ollivier |
| 7,778,984 B2 | 8/2010 | Zhang et al. |
| 7,792,789 B2 | 9/2010 | Prahlad et al. |
| 7,797,453 B2 | 9/2010 | Meijer et al. |
| 7,814,149 B1 | 10/2010 | Stringham |
| 7,814,351 B2 | 10/2010 | Lubbers et al. |
| 7,818,082 B2 | 10/2010 | Roumeliotis et al. |
| 7,822,967 B2 | 10/2010 | Fung |
| 7,840,537 B2 | 11/2010 | Gokhale et al. |
| 7,882,077 B2 | 2/2011 | Gokhale et al. |
| 7,899,788 B2 | 3/2011 | Chandhok et al. |

(56) References Cited

U.S. PATENT DOCUMENTS

| | | | |
|---|---|---|---|
| 7,917,438 B2 | 3/2011 | Kenedy et al. |
| 7,996,270 B2 | 8/2011 | Sundaresan |
| 8,001,277 B2 | 8/2011 | Mega et al. |
| 8,037,028 B2 | 10/2011 | Prahlad et al. |
| 8,065,166 B2 | 11/2011 | Maresh et al. |
| 8,108,427 B2 | 1/2012 | Prahlad et al. |
| 8,112,605 B2 | 2/2012 | Kavuri |
| 8,140,786 B2 | 3/2012 | Bunte et al. |
| 8,219,524 B2 | 7/2012 | Gokhale |
| 8,266,406 B2 | 9/2012 | Kavuri |
| 8,285,681 B2 | 10/2012 | Prahlad et al. |
| 8,296,534 B1 | 10/2012 | Gupta et al. |
| 8,307,177 B2 | 11/2012 | Prahlad et al. |
| 8,316,091 B2 | 11/2012 | Hirvela et al. |
| 8,321,688 B2 | 11/2012 | Auradkar et al. |
| 8,352,608 B1 | 1/2013 | Keagy et al. |
| 8,364,802 B1 | 1/2013 | Keagy et al. |
| 8,370,307 B2 | 2/2013 | Wolfe |
| 8,396,838 B2 | 3/2013 | Brockway et al. |
| 8,407,190 B2 | 3/2013 | Prahlad et al. |
| 8,417,697 B2 | 4/2013 | Ghemawat et al. |
| 8,434,131 B2 | 4/2013 | Varadharajan et al. |
| 8,510,573 B2 | 8/2013 | Muller et al. |
| 8,527,549 B2 | 9/2013 | Cidon |
| 8,566,362 B2 | 10/2013 | Mason, Jr. et al. |
| 8,578,120 B2 | 11/2013 | Attarde et al. |
| 8,612,439 B2 | 12/2013 | Prahlad et al. |
| 8,626,741 B2 | 1/2014 | Vijayakumar et al. |
| 8,635,184 B2 | 1/2014 | Hsu et al. |
| 8,674,823 B1 | 3/2014 | Contario et al. |
| 8,683,103 B2 | 3/2014 | Ripberger |
| 8,707,070 B2 | 4/2014 | Muller |
| 8,769,048 B2 | 7/2014 | Kottomtharayil |
| 8,799,242 B2 | 8/2014 | Leonard et al. |
| 8,849,761 B2 | 9/2014 | Prahlad et al. |
| 8,849,955 B2 | 9/2014 | Prahlad et al. |
| 8,924,511 B2 | 12/2014 | Brand |
| 8,950,009 B2 | 2/2015 | Vijayan et al. |
| 9,021,282 B2 | 4/2015 | Muller |
| 2002/0083079 A1 | 6/2002 | Meier et al. |
| 2002/0095609 A1 | 7/2002 | Tokunaga |
| 2002/0129106 A1 | 9/2002 | Gutfreund |
| 2002/0194033 A1 | 12/2002 | Huff |
| 2002/0194511 A1 | 12/2002 | Swoboda |
| 2003/0200222 A1 | 10/2003 | Feinberg et al. |
| 2004/0210724 A1 | 10/2004 | Koning et al. |
| 2005/0076251 A1 | 4/2005 | Barr et al. |
| 2005/0268121 A1* | 12/2005 | Rothman ............ G06F 1/3221 713/300 |
| 2006/0058994 A1 | 3/2006 | Ravi et al. |
| 2006/0101174 A1 | 5/2006 | Kanamaru et al. |
| 2006/0206507 A1 | 9/2006 | Dahbour |
| 2006/0224846 A1 | 10/2006 | Amarendran et al. |
| 2006/0242356 A1 | 10/2006 | Mogi et al. |
| 2007/0073970 A1* | 3/2007 | Yamazaki ............ G06F 1/3221 711/114 |
| 2007/0079156 A1 | 4/2007 | Fujimoto |
| 2007/0101173 A1* | 5/2007 | Fung ................... G06F 1/3209 713/300 |
| 2007/0168606 A1 | 7/2007 | Takai et al. |
| 2008/0005168 A1 | 1/2008 | Huff et al. |
| 2008/0228771 A1 | 9/2008 | Prahlad et al. |
| 2008/0301479 A1* | 12/2008 | Wood ................... G06F 1/3203 713/322 |
| 2009/0268903 A1 | 10/2009 | Bojinov et al. |
| 2009/0287665 A1 | 11/2009 | Prahlad et al. |
| 2009/0319534 A1 | 12/2009 | Gokhale |
| 2010/0070448 A1 | 3/2010 | Omoigui |
| 2010/0070466 A1 | 3/2010 | Prahlad et al. |
| 2010/0070474 A1 | 3/2010 | Lad |
| 2010/0082672 A1 | 4/2010 | Kottomtharayil et al. |
| 2010/0082700 A1 | 4/2010 | Parab |
| 2010/0082713 A1 | 4/2010 | Frid-Nielsen et al. |
| 2010/0162002 A1 | 6/2010 | Dodgson et al. |
| 2010/0257403 A1 | 10/2010 | Virk et al. |
| 2010/0269164 A1 | 10/2010 | Sosnosky et al. |
| 2010/0274772 A1 | 10/2010 | Samuels |
| 2010/0318782 A1 | 12/2010 | Auradkar et al. |
| 2010/0332401 A1 | 12/2010 | Prahlad et al. |
| 2010/0333116 A1 | 12/2010 | Prahlad et al. |
| 2011/0040824 A1 | 2/2011 | Harm |
| 2011/0191544 A1 | 8/2011 | Naga et al. |
| 2011/0277027 A1 | 11/2011 | Hayton et al. |
| 2012/0131645 A1 | 5/2012 | Harm |
| 2012/0240183 A1 | 9/2012 | Sinha |
| 2013/0007245 A1 | 1/2013 | Malik et al. |
| 2013/0035795 A1 | 2/2013 | Pfeiffer et al. |
| 2013/0125198 A1 | 5/2013 | Ferguson et al. |
| 2013/0238572 A1 | 9/2013 | Prahlad et al. |
| 2013/0262385 A1 | 10/2013 | Kumarasamy et al. |

FOREIGN PATENT DOCUMENTS

| | | |
|---|---|---|
| CN | 1936818 A | 3/2007 |
| CN | 1968254 | 5/2007 |
| EP | 0259912 A1 | 3/1988 |
| EP | 0405926 A2 | 1/1991 |
| EP | 0467546 A2 | 1/1992 |
| EP | 0774715 A1 | 5/1997 |
| EP | 0809184 A1 | 11/1997 |
| EP | 0817040 A2 | 1/1998 |
| EP | 0899662 A1 | 3/1999 |
| EP | 0981090 A1 | 2/2000 |
| WO | WO-9513580 A1 | 5/1995 |
| WO | WO-9912098 A1 | 3/1999 |

OTHER PUBLICATIONS

Second Office Action in Chinese Application No. 201210585073.2, dated Nov. 18, 2015, 17 pages, with English.
"Amazon Web Services@Amazon.com." http://web.archive.org/web/20080819144354/http://aws.amazon.com/s3, Aug. 19, 2008.
Armstead et al., "Implementation of a Campwide Distributed Mass Storage Service: The Dream vs. Reality," IEEE, Sep. 11-14, 1995, pp. 190-199.
Arneson, "Mass Storage Archiving in Network Environments," Digest of Papers, Ninth IEEE Symposium on Mass Storage Systems, Oct. 31, 1988-Nov. 3, 1988, pp. 45-50, Monterey, CA.
Bates, S. et al., "Sharepoint 2007 User's Guide," pp. 1-88, 2007, Springer-Verlag New York, Inc., 104 pages.
Brandon, J., "Virtualization Shakes Up Backup Strategy," <http://www.computerworld.com>, Internet accessed on Mar. 6, 2008, 3 pages.
Cabrera et al., "ADSM: A Multi-Platform, Scalable, Backup and Archive Mass Storage System," Digest of Papers, Compcon '95, Proceedings of the 40th IEEE Computer Society International Conference, Mar. 5, 1995-Mar. 9, 1995, pp. 420-427, San Francisco, CA.
Chiappetta, Marco, "ESA Enthusiast System Architecture," <http://hothardware.com/Articles/NVIDIA_ESA_Enthusiast_System_Architecture/>, Nov. 5, 2007, 2 pages.
CommVault Systems, Inc., "A CommVault White Paper: VMware Consolidated Backup (VCB) Certification Information Kit," 2007, 23 pages.
CommVault Systems, Inc., "CommVault Solutions—VMware," <http://www.commvault.com/solutions/vmware/>, internet accessed Mar. 24, 2008, 2 pages.
CommVault Systems, Inc., "Enhanced Protection and Manageability of Virtual Servers," Partner Solution Brief, 2008, 6 pages.
Davis, D., "3 VMware Consolidated Backup (VCB) Utilities You Should Know," Petri IT Knowlegebase, <http://www.petri.co.il/vmware-consolidated-backup-utilities.htm>, internet accessed on Jul. 14, 2008, Jan. 7, 2008.
Davis, D., "Understanding VMware VMX Configuration Files," Petri IT Knowledgebase, <http://www.petri.co.il/virtual_vmware_vmx_configuration_files.htm>, internet accessed on Jun. 19, 2008, 6 pages.
Davis, D., "VMware Server & Workstation Disk Files Explained," Petri IT Knowledgebase, <http://www.petri.co.il/virtual_vmware_files_explained.htm>, internet accessed on Jun. 19, 2008, 5 pages.

(56) References Cited

OTHER PUBLICATIONS

Davis, D., "VMware Versions Compared," Petri IT Knowledgebase, <http://www.petri.co.il/virtual_vmware_versions_compared.htm>, internet accessed on Apr. 28, 2008, 6 pages.
Eitel, "Backup and Storage Management in Distributed Heterogeneous Environments," *IEEE*, Jun. 12-16, 1994, pp. 124-126.
Foster, et al., "Cloud Computing and Grid Computing 360-Degree Comparied," Grid Computing Environments Workshop, 2008.
Gait, J., "The Optical File Cabinet: A Random-Access File System For Write-Once Optical Disks," *IEEE Computer*, vol. 21, No. 6, pp. 11-22 (Jun. 1988).
International Search Report and Written Opinion for International Application No. PCT/US08/74686, dated Jun. 22, 2009, 13 pages.
International Search Report and Written Opinion for International Application No. PCT/US2010/040402, dated Feb. 24, 2011, 11 pages.
Jander, M., "Launching Storage-Area Net," *Data Communications*, US, McGraw Hill, NY, vol. 27, No. 4 (Mar. 21, 1998), pp. 64-72.
Liu et al., "Semantic data de-duplication for archival storage system", IEEE 2008, 9 pages.
Mell et al., "The NIST Definition of Cloud Computing," NIST Special Publication, 2011.
Microsoft Corporation, "How NTFS Works," Windows Server TechCenter, updated Mar. 28, 2003, Internet accessed Mar. 26, 2008, 26 pages.
Rosenblum et al., "The Design and Implementation of a Log-Structured File System," *Operating Systems Review SIGOPS*, vol. 25, No. 5, New York, US, pp. 1-15 (May 1991).
Sanbarrow.com, "Disktype-table," <http://sanbarrow.com/vmdk/disktypes.html>, internet accessed on Jul. 22, 2008, 4 pages.
Sanbarrow.com, "Files Used by a VM," <http://sanbarrow.com/vmx/vmx-files-used-by-a-vm.html>, internet accessed on Jul. 22, 2008, 2 pages.
Sanbarrow.com, "Monolithic Versus Split Disks," <http://sanbarrow.com/vmdk/monolithicversusspllit.html>, internet accessed on Jul. 14, 2008, 2 pages.
VMware, Inc., "Open Virtual Machine Format," <http://www.vmware.com/appliances/learn/ovf.html>, internet accessed on May 6, 2008, 2 pages.
VMware, Inc., "OVF, Open Virtual Machine Format Specification, version 0.9," White Paper, <http://www.vmware.com>, 2007, 50 pages.
VMware, Inc., "The Open Virtual Machine Format Whitepaper for OVF Specification, version 0.9," White Paper, <http://www.vmware.com>, 2007, 16 pages.
VMware, Inc., "Understanding VMware Consolidated Backup," White Paper, <http://www.vmware.com>, 2007, 11 pages.
VMware, Inc., "Using VMware Infrastructure for Backup and Restore," Best Practices, <http://www.vmware.com>, 2006, 20 pages.
VMware, Inc., "Virtual Disk API Programming Guide," <http://www.vmware.com>, Revision Apr. 11, 2008, 2008, 44 pages.
VMware, Inc., "Virtual Disk Format 1.1," VMware Technical Note, <http://www.vmware.com>, Revision Nov. 13, 2007, Version 1.1, 2007, 18 pages.
VMware, Inc., "Virtual Machine Backup Guide, ESX Server 3.0.1 and VirtualCenter 2.0.1," <http://www.vmware.com>, updated Nov. 21, 2007, 74 pages.
VMware, Inc., "Virtual Machine Backup Guide, ESX Server 3.5, ESX Server 3i version 3.5, VirtualCenter 2.5," <http://www.vmware.com>, updated Feb. 21, 2008, 78 pages.
VMware, Inc., "Virtualized iSCSI SANS: Flexible, Scalable Enterprise Storage for Virtual Infrastructures," White Paper, <http://www.vmware.com>, Mar. 2008, 13 pages.
VMware, Inc., "VMware Consolidated Backup, Improvements in Version 3.5," Information Guide, <http://www.vmware.com>, 2007, 11 pages.
VMware, Inc., "VMware Consolidated Backup," Product Datasheet, <http://www.vmware.com>, 2007, 2 pages.
VMware, Inc., "VMware ESX 3.5," Product Datasheet, <http://www.vmware.com>, 2008, 4 pages.
VMware, Inc., "VMware GSX Server 3.2, Disk Types: Virtual and Physical," <http://www.vmware.com/support/gsx3/doc/disks_types_gsx.html>, internet accessed on Mar. 25, 2008, 2 pages.
VMware, Inc., "VMware OVF Tool," Technical Note, <http://www.vmware.com>, 2007, 4 pages.
VMware, Inc., "VMware Workstation 5.0, Snapshots in a Linear Process," <http:/www.vmware.com/support/ws5/doc/ws_preserve_sshot_linear.html>, internet accessed on Mar. 25, 2008, 1 page.
VMware, Inc., "VMware Workstation 5.0, Snapshots in a Process Tree," <http://www.vmware.com/support/ws5/doc/ws_preserve_sshot_tree.html>, internet accessed on Mar. 25, 2008, 1 page.
VMware, Inc., "VMware Workstation 5.5, What Files Make Up a Virtual Machine?" <http://www.vmware.com/support/ws55/doc/ws_learning_files_in_a_vm.html>, internet accessed on Mar. 25, 2008, 2 pages.
Wang et al. "Performance analysis of data deduplication technology for storage", Proc. Of SPIE vol. 7517, 2007, 7 pages.
Wikipedia, "Cloud computing," <http://en.wikipedia.org/wiki/Cloud_computing>, internet accessed Jul. 8, 2009, 13 pages.
Wikipedia, "Cluster (file system)," <http://en.wikipedia.org/wiki/Cluster_%28file_system%29>, internet accessed Jul. 25, 2008, 1 page.
Wikipedia, "Cylinder-head-sector," <http://en.wikipedia.org/wiki/Cylinder-head-sector>, internet accessed Jul. 22, 2008, 6 pages.
Wikipedia, "File Allocation Table," <http://en.wikipedia.org/wiki/File_Allocation_Table>, internet accessed on Jul. 25, 2008, 19 pages.
Wikipedia, "Logical Disk Manager," <http://en.wikipedia.org/wiki/Logical_Disk_Manager>, internet accessed Mar. 26, 2008, 3 pages.
Wikipedia, "Logical Volume Management," <http://en.wikipedia.org/wiki/Logical_volume_management>, internet accessed on Mar. 26, 2008, 5 pages.
Wikipedia, "Storage Area Network," <http://en.wikipedia.org/wiki/Storage_area_network>, internet accessed on Oct. 24, 2008, 5 pages.
Wikipedia, "Virtualization," <http://en.wikipedia.org/wiki/Virtualization>, internet accessed Mar. 18, 2008, 7 pages.
International Search Report and Written Opinion for PCT/US2011/054374, dated May 2, 2012, 9 pages.

\* cited by examiner

Day 1

| Job | Order | Cell | Size | Building | Window |
|---|---|---|---|---|---|
| Job 1 | 1 | Cell A | 1 GB | 1 | ∅ |
| Job 2 | 4 | Cell A | 5 GB | 1 | ½ day |
| Job 3 | 4 | Cell B→A | 4 MB | 1, 2 | ½ day |
| Job 4 | 3 | Cell A | 2 GB | 1 | ¾ days |
| Job 5 | H | Cell C | 15 MB | 2 | 1/5 days |
| Job 6 | 2 | Cell A | 70 MB | 1 | ∅ |
| Job 7 | H | Cell B | 30 GB | 1, 2 | 1/5 days |
| ... | | ... | ... | ... | ... |

*FIG. 12*

POWER MANAGEMENT OF DATA PROCESSING RESOURCES, SUCH AS POWER ADAPTIVE MANAGEMENT OF DATA STORAGE OPERATIONS

CROSS-REFERENCE TO RELATED APPLICATIONS

This application is a divisional of U.S. patent application Ser. No. 14/138,473, filed Dec. 23, 2013 (U.S. Pat. No. 9,021,282), which is a divisional of U.S. patent application Ser. No. 12/671,794, filed Jun. 20, 2011 (U.S. Pat. No. 8,707,070), which is a U.S. National Phase Application of International Application Serial No. PCT/US2008/074686, filed Aug. 28, 2008, which claims priority to U.S. Provisional Application No. 60/968,500, filed on Aug. 28, 2007, each of the above listed applications are incorporated herein by reference in their entireties.

BACKGROUND

Power conservation continues to be a desire for many IT professionals and facilities managers. For example, the EPA published a report on Aug. 2, 2007, which warned of the rising energy toll for running data centers. One of the main findings of the report is that if current trends continue, energy consumption for U.S. data centers and servers will nearly double by 2011 to more than 100,000,000,000 kW per hour, costing the public and private sectors $7.4 billion annually and requiring an additional 10 power plants.

Data centers employ data storage components, some of which consume large amounts of power annually. Data storage operations commonly rely on networked and other complex systems, where transfers and other operations occur at different places, at different times, and for different needs, all of which consume different levels of power at different times. Hierarchical systems may be used, where various storage components are linked to one another and to the system via a storage management component. Some of the components may provide filtering or control capabilities for lower components in the hierarchy. Systems may then use these storage management components to operate or "oversee" the system and its various components. However, many of the management components are used simply to manage and collect data from the various components. These management components, however, fail to consider power requirements of the various components. Other problems exist too, as those skilled in the art will recognize based on the following Detailed Description.

BRIEF DESCRIPTION OF THE DRAWINGS

FIG. 12 shows a table employed by the global system server to determine power control distribution and the scheduling of data storage jobs.

Figure 1A:
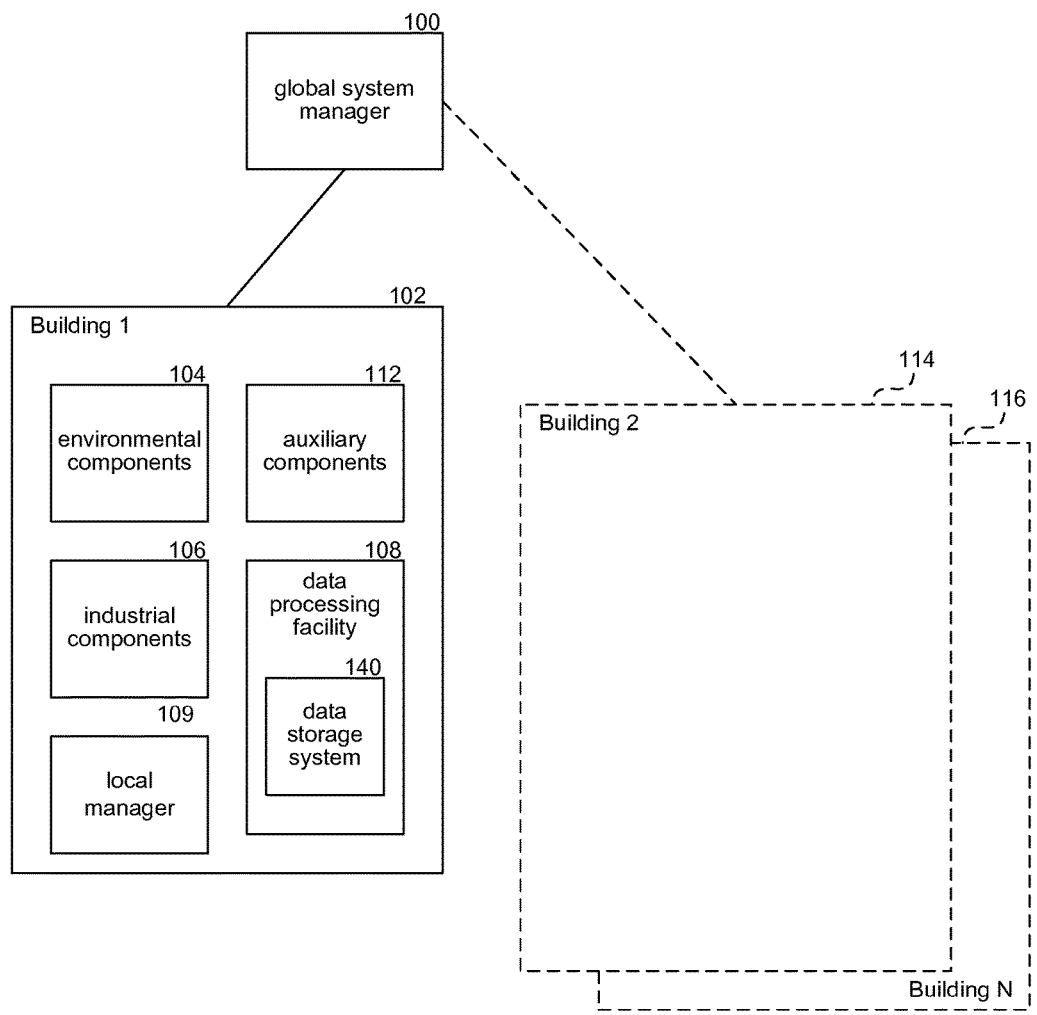
FIG. 1A is a block diagram illustrating a building with a data processing facility.

In the drawings, the same reference numbers and acronyms identify elements or acts with the same or similar functionality for ease of understanding and convenience. To easily identify the discussion of any particular element or act, the most significant digit or digits in a reference number refer to the Figure number in which that element is first introduced (e.g., element 810 is first introduced and discussed with respect to FIG. 8).

DETAILED DESCRIPTION

Described in detail below is a power sensitive system that manages power consumption in at least a data processing facility, as well as optionally in one or more buildings. Aspects of the invention are described with respect to a data storage system, however, those skilled in the art will recognize that the invention may apply to any data processing components, as well as any power consuming devices in a single building, or among several buildings such as within a campus. The system may be scaled to provide power savings for any size enterprise, from a few machines to a large international network. Indeed, with machines distributed geographically, data may be transmitted and then stored at locations where power is cheaper, such as in the Columbia River Valley, in Iceland, in the Middle East, or other locations known throughout the world for supplying low-cost energy.

Examples of the technology are concerned with systems and methods that monitor, control, or modify data storage systems and their operations so as to conserve power. Although described in connection with certain examples, the system described below is applicable to and may employ any wireless or hard-wired network or data processing and storage system that stores and conveys data from one point to another, including communication networks, enterprise networks, storage networks, and so on.

Examples of the technology provide methods and systems, such as hierarchical data processing or storage systems, that determine and perform power conservation actions by correlating trending information or historical reports and information obtained from and/or during data storage operations, as well as forecast data for future operations and performance. (A hierarchical system may be a system comprising a minimum of two components, where one of the components manages at least part of the other component.) The systems may employ flexible storage policies and may monitor the operation, power consumption, and storage of data for a given period to modify or redistribute storage operations based on results obtained during the monitoring period or determined in forecasts. The system may modify storage operations during the monitoring period, or may use any obtained information to modify future storage operations. Again, while aspects of the invention are described with respect to data storage operations and components, other data processing operations and components are equally applicable, as well as any power consuming components within a building or buildings.

One example is as follows: the system may look at future scheduled data storage operations, and characteristics of each operation, to group or distribute certain operations (e.g., grouping power intensive operations together (or distributing based on need, etc.)). The system may receive a report of a data transfer load, where the report indicates, for a given sample time, the number of individual storage operations (e.g., number of "jobs") running with respect to the number of jobs waiting to be performed. The system may use this information and related power data to redistribute jobs within a given window of time based on the type of job, or to redistribute system resources for a later data storage operation. For example, a backup may be required to be performed once a week, but within a three-day window. Therefore, the system may arrange jobs so that a small backup is performed together with a larger backup, thus enabling a drive to only be powered up once. In some cases, the system may redistribute the storage operations during a running data storage operation and adjust other components within a building to minimize power spikes or ensure that power remains below a threshold (e.g., turning off or reducing use of environmental components in the building such as heating or cooling).

While the term "building" is use in the example above, any size enterprise may, of course, employ aspects of the invention. Indeed, the system described herein may employ a tiered hierarchy, where each tier is related to power consumption. In other words, data storage operations (and components associated with those operations) are quantized into two or more discrete groups, such as a low power tier and a higher power tier. Data may be stored in the first, lower power tier, at least temporarily, before being migrated to a higher power tier.

For example, to avoid performing single sporadic writes to a disk or tape drive, such single writes can be cached and aggregated at devices within the lower power tier. Then, when a threshold number has accumulated, such writes may be migrated to devices at the higher power tier as a batch so that the tape or disk drive is powered up once. As described in greater detail below, the most power-intensive aspect of traditional disk storage may be operating fan motors to cool disk drives, followed by operating disk spindle rotors to rotate disks within the disk drive. For automated taped libraries, heavy power consumption is required to move a robotic arm to manipulate tapes, followed by operating tape drive motors, then operating fans within such libraries. The system described herein considers the various power requirements not only for each type of data storage device (disk, tape, etc.), but also for individual components within such devices to help a larger scale data storage enterprise operate more efficiently.

Various examples of the invention will now be described. The following description provides specific details for a thorough understanding and enabling description of these examples. One skilled in the art will understand, however, that the system may be practiced without many of these details. Additionally, some well-known structures or functions may not be shown or described in detail, so as to avoid unnecessarily obscuring the relevant description of the various examples.

The terminology used in the description presented below is intended to be interpreted in its broadest reasonable manner, even though it is being used in conjunction with a detailed description of certain specific examples of the system. Certain terms may even be emphasized below; however, any terminology intended to be interpreted in any restricted manner will be overtly and specifically defined as such in this Detailed Description.

Suitable System

FIG. 1A shows a power sensitive global system manager or server 100 communicating with a building 102 and optional additional buildings 114 and 116 that may be similar to building 102. Building 102 may include environmental components 104, industrial components 106, at least one data processing facility 108, and auxiliary components 112. Environmental components 104 may include heating components, cooling components (e.g., air conditioning), dehumidifiers, etc. Industrial components may be any machinery or device within the building, particularly devices requiring large amounts of energy, such as industrial dryers, heaters, electrolysis machines, etc. Auxiliary components may include any power consuming devices that are not important or critical to operations within the building, such as decorative lighting, fountains, etc. As explained herein, the global system manager 100 may analyze historical data and generate forecast data to conserve power within the building 102 by powering off or reducing the power consumption of various components or system elements within the building 102.

The data processing facility 108 may include any of a variety of data processing components, such as one or more servers, telecommunications components, input/output devices, etc. For the sake of the examples below, data processing facility 108 includes at least one data storage system 140, which includes any of a variety of data storage devices, such as one or more tape drives, one or more disk drives, etc.

Figure 1B:
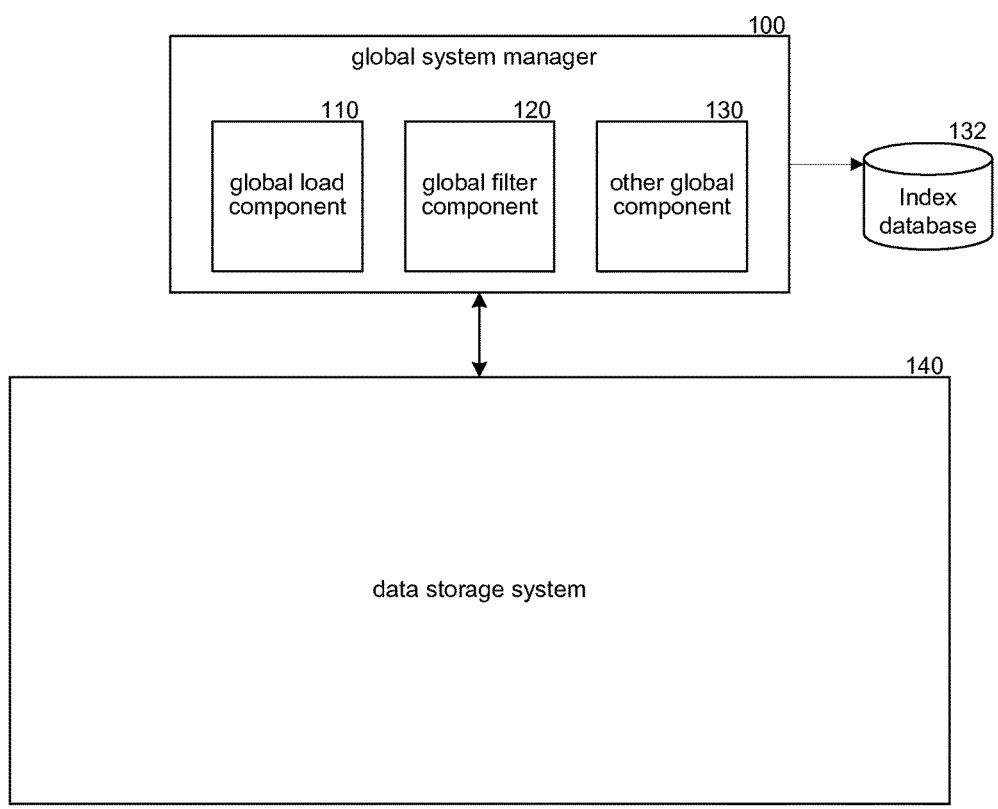
FIG. 1B is a block diagram illustrating a global system server, a portion of which resides in the data processing facility of FIG. 1A.

Referring to FIG. 1B, a block diagram illustrates the global system server, or manager 100, which may interact with a number of different data processing systems, such as data storage system 140. (Some examples of data storage systems will be discussed with respect to FIGS. 3 and 4.) Global manager 100 may include components such as a global power load component 110, a global command or filter component 120, or other global components 130, and be coupled to an index database 132 to store data described herein. Components 110, 120, and/or 130 act to receive, transmit, monitor, or control data processes and system resources within the data storage system 140 as described herein. Further, global manager 100 may interact with other data processing components in the facility, as well as other power consuming components in the building or campus as noted herein.

In particular, and as described below, global load component 110 may (directly or indirectly) monitor and gather data on the power consumption of components or devices within the building 102 and may generate forecast data indicating future expected power requirements for components within the building. Global filter component 120 permits global system manager 100 to apply global power conservation commands to components within one or more buildings.

Figure 2:
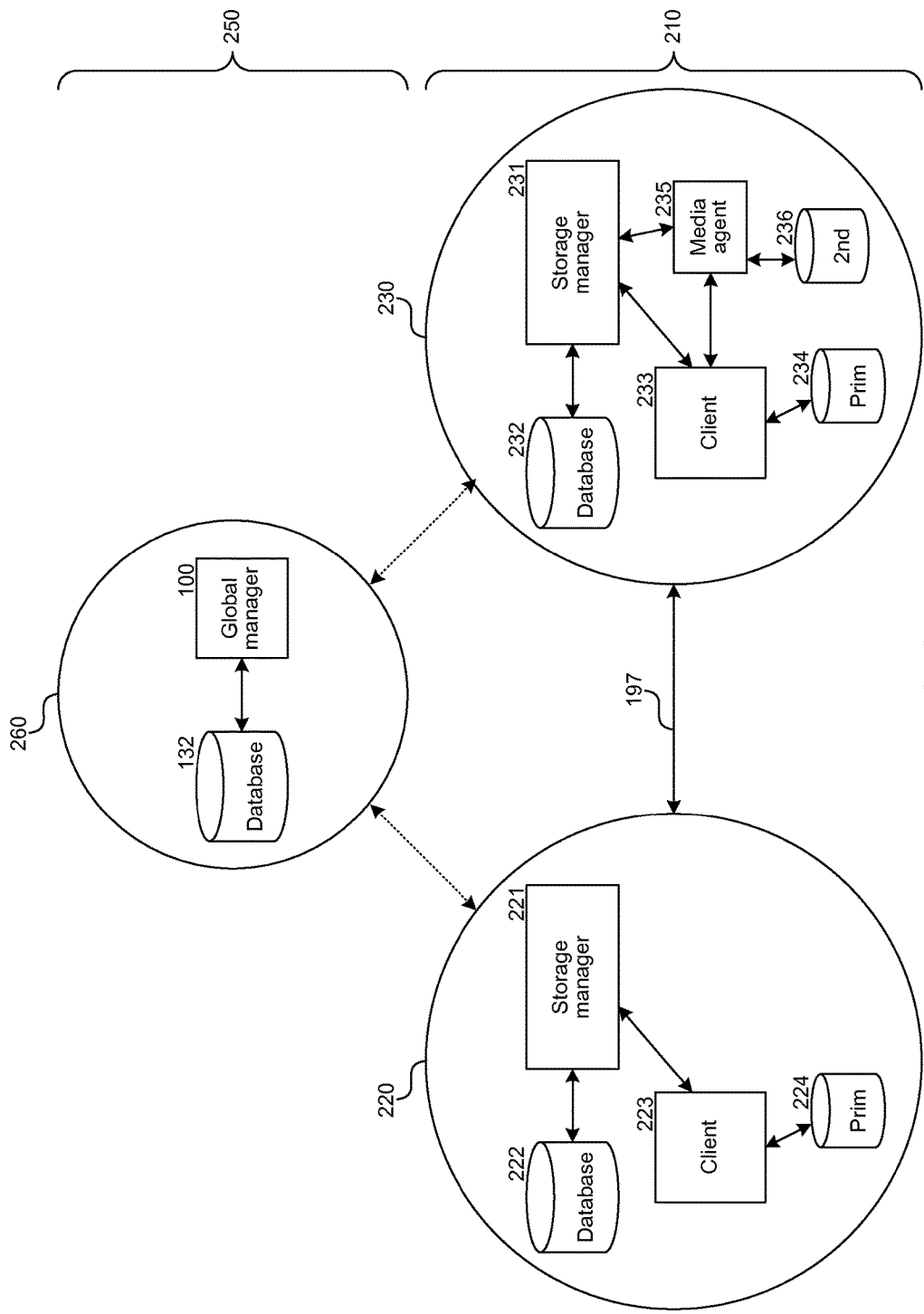
FIG. 2 is a block diagram illustrating a hierarchical data storage system.

Referring to FIG. 2, a block diagram illustrates a hierarchical data storage system with two levels (although more levels may exist): a storage operations level 210 and a global level 250. The global level 250 may contain a global operations cell 260 (similar to the global system manager 100), which may contain a global manager 100 and database 132. The storage operations level 210 may contain storage operations cells, such as cells 220 and 230. Cells 220 and 230 may always perform specified data storage operations or may perform varied data storage operations that depend on the needs of the system. The cells are logical groupings of components, each with particular power requirements and operations schedules. Each cell may be within a single building or span multiple buildings. One cell may share hardware with one or more other cells. Further, the term "cell" is intended to represent any size grouping of components and/or operations, from a single process running on a shared server to a much larger data processing and storage grouping that includes multiple servers, data storage devices, network components, and multiple processes utilizing such components, all of which may be geographically distributed. In other words, a "cell" is any set of one or more components and/or operations necessary for a data storage operation.

Cell 220 contains components used in data storage operations, such as a storage manager 221, a database 222, a client 223, and a primary storage database 224. Cell 230 may contain similar components, such as storage manager 231, a database 232, a client 233, and a primary storage database 234. In this example, cell 230 also contains a media agent 235 and a secondary database 236. Both cells 220 and 230 communicate with global manager 261, providing information related to the data storage operations of their respective cells.

Figure 3:
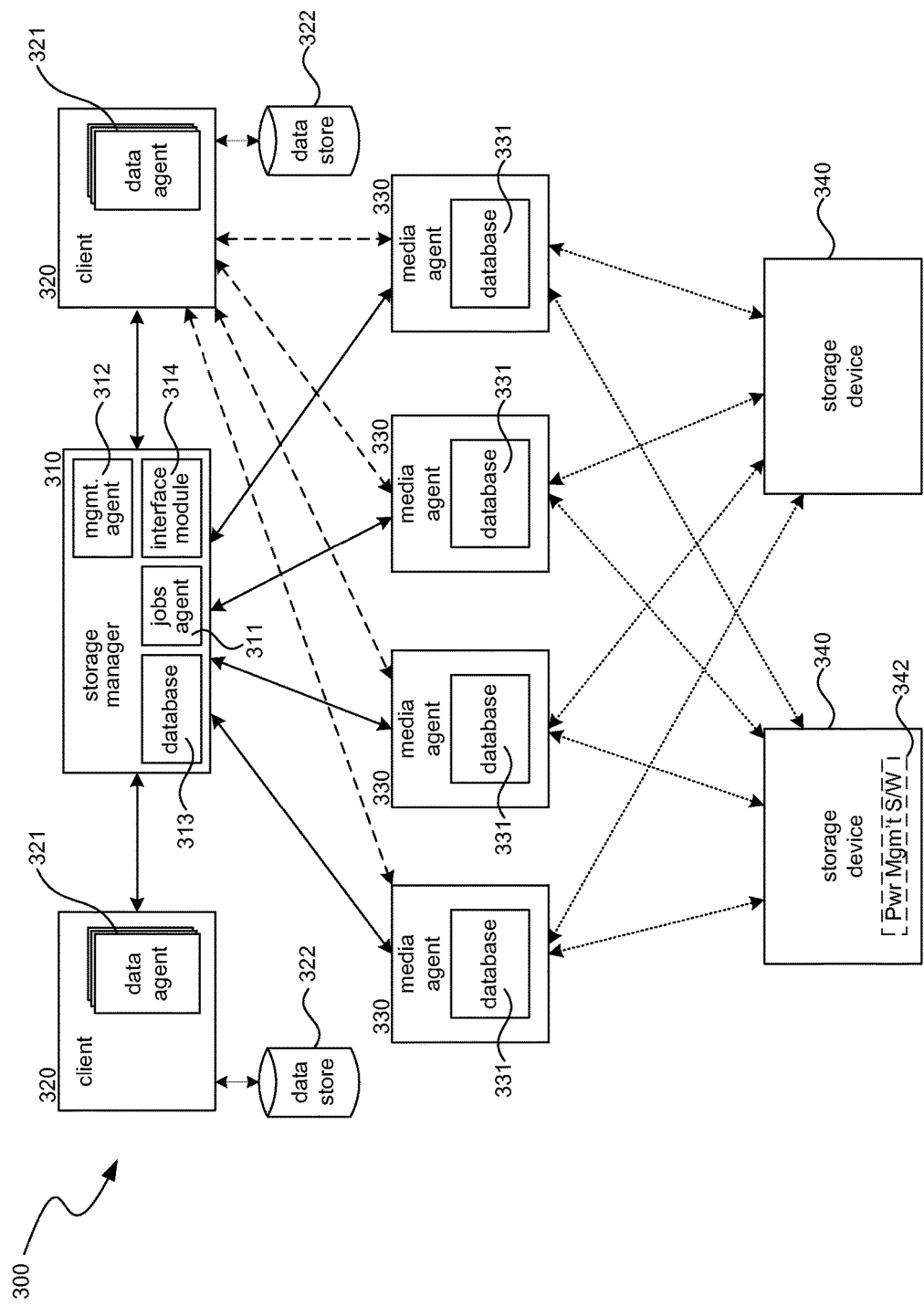
FIG. 3 is a block diagram illustrating components of a storage operations cell.

Referring to FIG. 3, a block diagram illustrating components of a storage operations cell is shown. Storage operations cells (such as cells 220 or 230 of FIG. 2) may contain some or all of the following components, depending on the use of the cell and the needs of the system. For example, cell 300 contains a storage manager 310, clients 320, multiple media agents 330, and multiple storage devices 340. Storage manager 310 controls media agents 330, which are responsible, at least in part, for transferring data to storage devices 340. Storage manager 310 includes a jobs agent 311, a management agent 312, a database 313, and an interface module 314. Storage manager 310 communicates with clients 320. Clients 320 access data, which will be stored by the system, from datastore 322 via a data agent 321. The system uses media agents 330, which contain databases 331, to transfer and store data in storage devices 340. Power management software or firmware 342 in one or more of the storage devices 340 can monitor power consumption of that device and provide power consumption data to the global manager, as described herein.

Cells 300 may include software and/or hardware components and modules used in data storage operations. The cells 300 may be transfer cells that function to transfer data during data store operations. The cells 300 may perform other storage operations (or storage management operations) other that operations used in data transfers. For example, cells 300 may perform creating, storing, retrieving, and/or migrating primary and secondary data copies. The data copies may include snapshot copies, backup copies, HSM copies, archive copies, Continuous Data Replication (CDR), virtual machines, and so on. The cells 300 may also perform storage management functions that may push information to higher level cells, including global manager cells.

Note: Individual hardware components in the various cells have different power consumption curves, although similar devices, or similar classes of devices, may have similar power curves (e.g., the same Hitachi disk drive has a similar power curve based on particular operations and other factors such as age, environmental conditions, etc.). The software/firmware 342 may store such power consumption curves or other power performance data for the storage device 340.

In some examples, the system performs storage operations based on storage policies to conserve power, avoid power spikes, or otherwise meet previously defined power conservation requirements (such as for the building 102). A "storage policy" may be, for example, a data structure that includes a set of preferences or other criteria considered during storage operations. The storage policy is directly or indirectly associated with the power requirements and may determine or define various data storage parameters, such as a storage location, a relationship between components, network pathways, accessible datapipes, retention schemes, compression or encryption requirements, preferred components, preferred storage devices or media, and so on. In other words, a "storage policy" may be a power related storage preference. As described herein, a schedule policy or schedule for performing disk storage operations may be combined with the storage policy to provide for an overall power related storage preference. Storage policies may be stored in storage manager 310, 221, 231, or may be stored in global manager 100 as discussed herein. The previously defined power conservation requirements or plan ("power requirements") set forth parameters that global manager 100 employs to ensure certain power requirements are met, such as ensuring that power spikes over a threshold do not occur, average power over a given period of time is below a threshold, monthly power expenditures are below thresholds, and so forth, as described herein.

Additionally or alternatively, the system may implement or utilize schedule policies. A schedule policy specifies when to perform storage operations, how often to perform storage operations, and/or other parameters. The schedule policy, as described below, allows global manager 100 and/or storage manager 310 to determine optimal or near optimal times to perform storage operations that satisfy the power requirements. The schedule policy may also define the use of sub-clients, where one type of data (such as email data) is stored using one sub-client, and another type of data (such as database data) is stored using another sub-client. In these cases, storage operations related to specific data types (email, database, and so on) may be distributed between cells. Further, the global manager and/or storage manager may perform storage operations within a window to satisfy the power requirements, such as by aggregating small storage operations to reduce the number of times a drive is powered up, or by moving an operation to a time period when power consumption in the building is forecasted to be lower.

Figure 4:
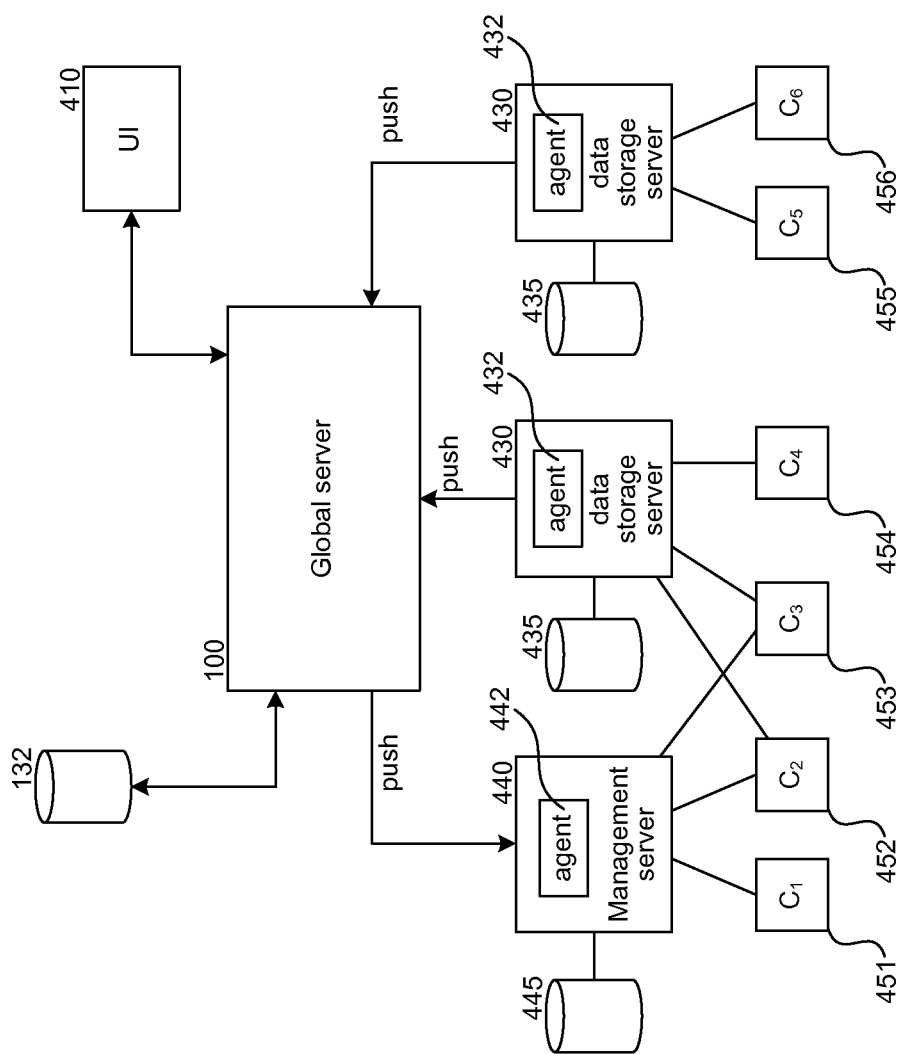
FIG. 4 is a block diagram illustrating interaction between a global cell and data storage cells.

Referring to FIG. 4, a block diagram illustrating interaction between the global cell and data storage cells is shown. Global manager 100 may communicate with a database 132 and a user interface 410 and may contain global load components, global filter components, and other components configured to determine actions based on received data storage information and historic/forecasted power usage. Database 132 may store storage policies, schedule policies, historic/forecast power data, received sample data, other storage operation information, and so on. User interface 410 may display system information to an administrator or user. Further details with respect to the user interface display are discussed below.

Global manager 100 may push or otherwise communicate data to a management server 440. Server 440 communicates with a database 445 and clients 451, 452, and/or 453, and have an agent 442. Data storage servers 430 communicate data to the global manager 100 and contain data agents 432 and databases 435. Clients 454, 455, and/or 456 thus communicate with these servers, which form at least part of a data processing or data storage enterprise.

Global manager 100 is able to perform actions (such as redistributing storage operations), and to apply these actions to the data storage system via a management server to fulfill the power requirements. Global manager 100 receives information used to determine the actions from the data storage servers 430. In this example, the global manager 100 acts as a hub in the data storage system by sending information to modify data storage operations and monitoring the data storage operations to determine how to improve the operations and power requirements. Alternatively or additionally, a local manager 109 may perform some or all of such operations (see FIG. 1).

Figure 13:
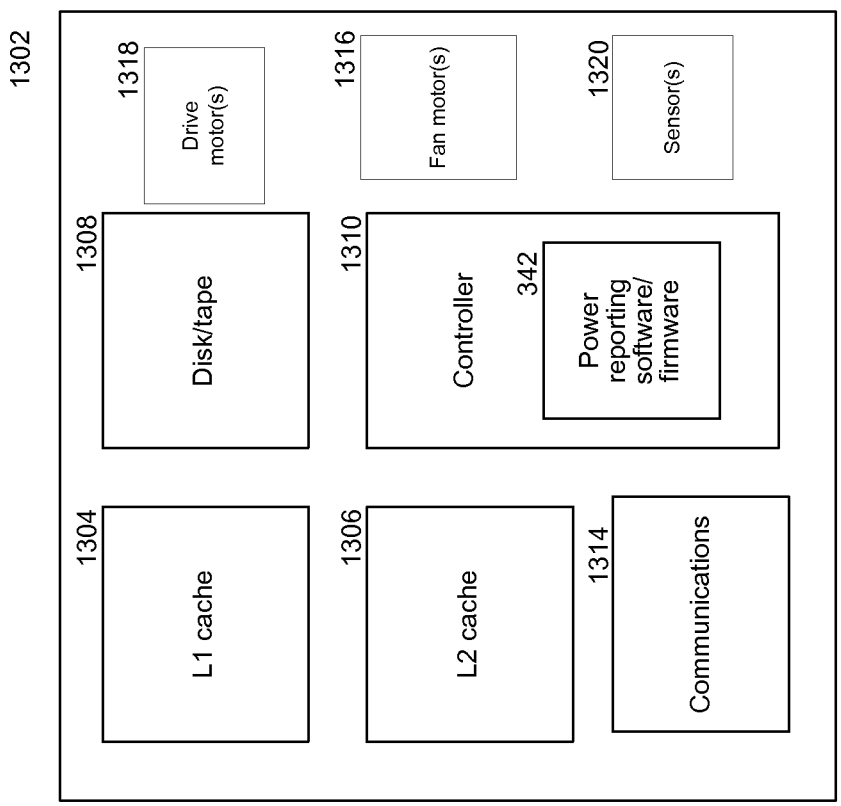
FIG. 13 is a block diagram illustrating a data storage device that may implement aspects of the invention.

FIG. 13 shows an example of a data storage device 1302, similar to storage devices 340, that provide improved power efficiency and that may be employed within, for example, system 300 of FIG. 3. The data storage device 1302 includes initial, fast L1 cache 1304 that can rapidly store data and pass such data to L-2 cache 1306, which may be a solid state Flash "disk" or other write cache. Incoming data thus is quickly and initially stored or buffered in L1 cache 1304 before being passed to non-volatile L2 cache 1306. Data can then be aggregated in L2 cache 1306 before being written to disk/tape 1308, which can be cheap, conventional bulk storage.

A controller 1310 can implement block-level virtualization, such that the L1 cache 1304 or L2 cache 1306 is mapped to conventional storage, with synchronization/migration strategies described herein to minimize the need to power up individual spindle motors associated with one or more disk drives (or drive motors for tape). Thus, the controller 1310 can directly control one or more fan motors 1316 and spindle motors 1318 to reduce power consumption as described below. Moreover, the storage device 1302 may also communicate with the global system manager 100 or local manager 109 (via communications unit 1314) enabling it to be controlled remotely. One or more sensors 1320 can monitor, for example, the temperature within the data storage device 1302. Such sensors can also monitor other operations within the data storage device, such as the collection of metrics on the operation of read/write head access motors, the seek time for a tape drive, and so forth. The controller 1310 may then forward such metrics or other data gathered from the sensors to the global or local managers via the communications unit. (The metrics may also be used (e.g., by the managers or controller) to generate statistics on such parameters sensed.) The power management software for firmware 342 can also instruct the controller 1310 to gather such sensory data, and/or other data within the data storage device 1302 (e.g., power curves/performance, as noted herein) and report it to the global system manager 100, local manager 109, or both (via the communications unit 1314). Other details on operation are provided below.

Power Reports and Associated Actions

Reports or other collected data that sample data storage operations and storage device operations provide meaningful information to global manager 100. Using this information, the global manager 100 (via load component 110 or other similar components) may determine actions to be performed to help conserve power within the building or buildings. Some of these actions may include rescheduling storage operations, redistributing data store operations, transferring operations from one resource to another, defining future storage policies, setting global power conservation filters, and so on.

Figure 5:
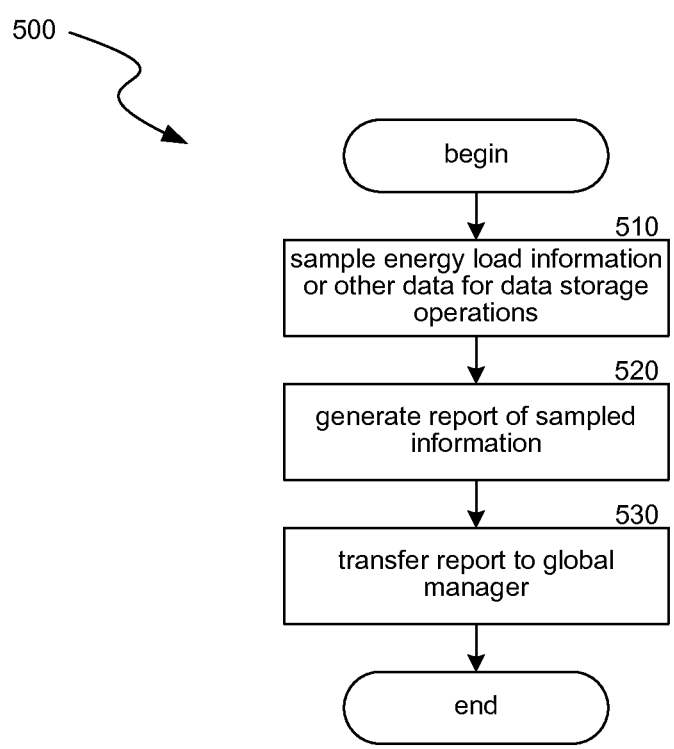
FIG. 5 is a flow diagram illustrating sending an example energy load report for use by a global manager or server.

Referring to FIG. 5, a flow diagram illustrating a routine 500 provides an example of an energy load report for a global manager or server. In step 510, the system samples energy load information from running data storage operations. For example, the system may sample the number of transferring jobs, the number of waiting jobs, the number of data streams for a specific media agent, and so on. Agents at some or all cells may be configured to gather and log data, which is then sent to generate the energy load report.

Various hardware components can provide such energy load information, such as data on energy consumption and operations provided by data storage devices. A disk drive or tape drive, such as device 1302, may include, within its firmware 342, instructions requiring the drive either periodically, or in response to a query message, to provide information regarding the operation of that device. Such information can include the time and day at which spindle rotors and fans are powered on and off, other operations are performed, and so forth. Alternatively, or additionally, the system may monitor, via a bus or communications port (e.g., part of universal plug and play (UPP)), power characteristics and operations, which the global system manager 100 employs in making power conservation decisions described herein.

Other ways to monitor devices and gather energy load data may include using an external power meter coupled to network components to gather and transmit to the local manager 109 and/or global system manager 100 device, operation and energy load data. Such data is preferably granular, down to the level of operation for specific device components (spindle motor, fan motor, robotic arm operation, etc.), although it could be gathered on a much coarser level, such as the amount of power consumed by whole devices or by data storage facilities. Such data may be gathered from existing technologies or from the local public utility. By comparing a schedule of jobs or storage operations performed by a data storage facility or by a specific device, with externally obtained data such as that from a public utility, the system may match devices/facilities with power consumption to determine how much power was consumed for a specific data storage operation at a specific location and/or by a specific device. Such power consumption information may be broad, generic data, or may be converted to standard units employed by the system, such as the power storage quantity (e.g., megawatt hours per gigabyte). Overall, one skilled in the relevant art will recognize that the terms "energy load data," "power consumption," and the like, are generally used interchangeably herein.

Alternatively, or additionally, the system can transmit one or more test packets or test files through the network and store them on a given data storage device and have metrics reported back on such operations. For example, the global system manager 100 may transmit a test file of one gigabyte to multiple different data storage resources (e.g., different disk drives, tape drives, etc.) along different network paths, and in different cells or locations, and then request that appropriate metric data be fed back. The global system manager 100 then receives such reporting metrics on how long the operation took to be completed, what power requirements were necessary to complete the operation, etc. Such data can then be stored in the index database 132

(and/or other databases) to help estimate the power requirements for future data storage operations. Such future operations may then be appropriately scaled. While not exact, a good estimate may be found if a job were simply scaled up given that a 100-gigabyte job would utilize 100 times more energy than the one-gigabyte test job (the actual amount likely being less). An example including further details on processes for sending a test packet or file to determine the performance of data storage resources may be found in the assignee's U.S. patent application Ser. No. 11/269,513, filed Nov. 7, 2005, entitled "Method and System for Monitoring a Storage Network."

In step 520, the system generates a report containing some or all of the sampled information. The report may contain the information as sampled or may provide analyses or algorithmically generated information for the sampled information. For example, the system may obtain certain data and perform certain statistical analyses with respect to the data, like determining a mean and/or standard deviation. Moreover, the system may gather information on the power consumption of various data storage components and future scheduled or predicted data storage jobs in order to forecast future power consumption.

In step 530, the system transfers the report to a global manager 100. The report can track usage and files or operations associated with such usage. Indeed, as described herein, the system may employ data classification techniques (with associated data or software agents) to monitor data storage operations, which can then be compared to energy load information to track and manage power consumed per data storage operations, even down to individual file or client computer levels. The data classification agent can gather and create an index of power usage and associate such usage with specific devices, files managed/stored, etc. Alternatively or additionally, a software agent running on one or more of the client computers 451-456 can provide such data to the global system manager. Furthermore, data processing devices themselves (e.g., storage devices 340) can provide such data to the global system manager.

Overall, much of the data gathered herein may be performed by software agents and stored in indexes, using the techniques described in detail in U.S. patent application Ser. No. 11/564,180, filed Nov. 28, 2006, published Aug. 30, 2007, as U.S. Publication No. 2007-0203938, entitled "Systems and Methods for Classifying and Transferring Information in a Storage Network." Under the techniques described in this application, such agents can gather data associated with power consumption for use by the global manager 100. The agents can gather or index metadata associated with power consumption and related parameters, including the frequency of access to a file or storage device and the relationship of a file to other files (especially as related to certain storage operations, such as those performed periodically as part of a regular storage policy). The agents can also gather additional information, such as power usage by department, by building, by work groups, and other aggregations of data processing components (including data storage components), and not just by individual components themselves. As described more fully below, the system may then use such data, along with other data that may be gathered from third-party data sources (e.g., energy price, weather forecast, or other data) to determine how to best allocate resources and perform data processing operations.

An energy load report may be a comprehensive report that covers an entire system or enterprise. The report may sample information from all cells and storage systems in any and all buildings under the global system manager's control. The energy load report may also cover any combination of storage cells, components, and/or systems. The energy load report can provide to an organization the cost to move data. While files may be typically sorted based on file size, the system can also provide a power size associated with each file that may help determine power costs for moving or storing that data. This "power size" metric may then be tied to the storage policy to help manage that data. Thus, the system could employ more extensive power conservation techniques for data over a certain power size threshold. Some data, such as accounting or sales data, may have a high priority and may be less susceptible to the power size metric. In other words, such data may be so important to an organization that it must be copied, managed, or moved regardless of the power required to do so. However, other, less important data, such as daily emails, aged data, etc., may be more susceptible to energy efficient data management, and thus the power size metric will play a bigger role in storage policy for such data. In other words, the system can analyze an energy cost associated with a file, possibly with other data such as a priority ranking for that file, an determine if a resulting metric or value exceed a threshold. If so, then the system may implement a storage policy or power conservation operation (as described below for FIG. 14). Of course, the relative priority of and any storage policies associated with data will differ between organizations, and possibly within groups of a given organization.

The system can provide feedback on how much power is required to store certain data. For example, a system administrator may determine that the same large database, which is being copied weekly, has associated with it varying power consumption metrics. (This same example may likewise apply to two or more files having similar characteristics, such as based on size, energy cost per megabyte, etc., and where that similarity may be within a certain standard deviation.) The administrator can then determine, also from the report, that the differences in power consumption are related not to the amount of data, but to specific network components being employed, type of data, processes performed, etc. Thus, the administrator may modify the storage policy for that database to employ more energy efficient data storage components or processes. Alternatively or additionally, the administrator may identify which network components, data storage components, or other components within the enterprise are energy inefficient and look to replacing those components with more energy efficient ones. Furthermore, the system itself may automatically implement or suggest to the administrator a plan to group smaller data storage jobs together, distribute jobs to avoid high peaks of activity, etc., as described herein. The system may also automatically switch to employ more efficient resources. This may be done using known techniques, such as Baysian testing, or semi-automatically through empirical testing.

Figure 6:
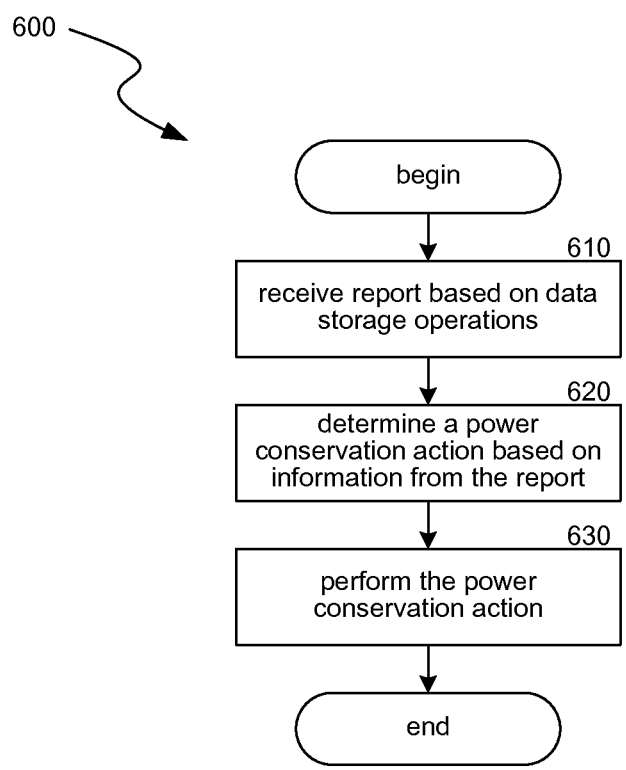
FIG. 6 is a flow diagram illustrating a routine for performing an action based on an energy load report.

FIG. 6 shows a flow diagram illustrating a routine 600 for performing a power conservation action based on the energy load report. In step 610, the system receives the energy load report that contains information related to power and data storage operations. The system may receive any of three more types of reports, such as the following three examples (each of which is described in detail below): (1) a report that provides information on future data storage operations to be performed (with or without power forecast data), (2) a report that provides information on running operations (e.g., the number of jobs completed, running, and waiting, at a given cell), or (3) a report that provides information on completed operations (such as a previous night's operation information).

Figure 7A:
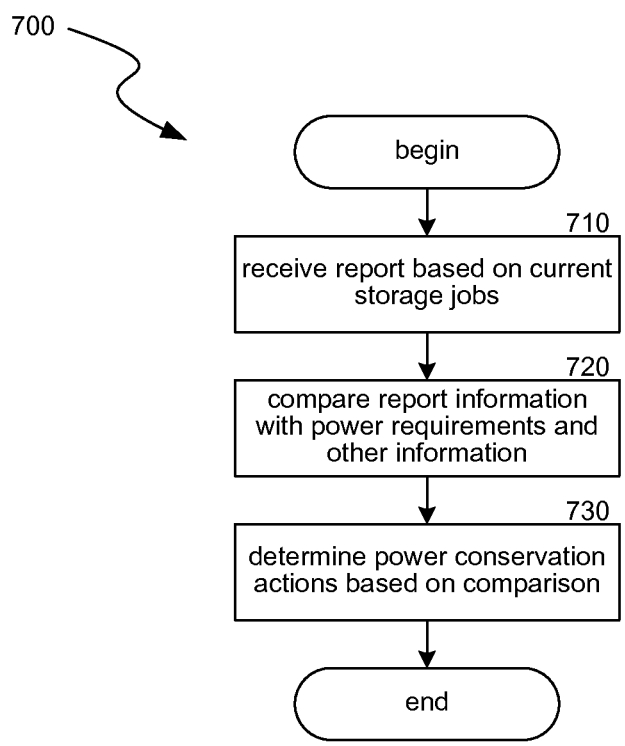
FIG. 7A is a flow diagram illustrating a routine for determining an action.

Upon receiving a report or reports, the system, in step 620, determines an action to be performed based on the report. Referring to FIG. 7A, a flow diagram illustrating a routine 700 for determining an appropriate power conservation action is shown. In step 710, the system receives a report based on data storage operations. The system, in step 720, compares information from the report to the power requirements and one or more known pieces of other information, such as power curves for data storage components.

Considering the first report (1) above containing future data storage operations, the system (e.g., the global manager 100) analyzes a schedule of up coming jobs and compares those jobs to power curves for data storage devices to be employed in those jobs and one or more power requirements. Alternatively or additionally, the system may look up an average kilowatts per gigabyte power consumption parameter for the system, such as from a table stored in the index database 132 of the global system manager 100. Such a table may provide a simple, coarse metric to be used in reports and decision making within the system for the energy efficiency of network and data storage components (especially where finer metrics are unavailable or too burdensome to compute). If the report lacks core test data, then the global manager 100 may retrieve from or generate forecast data for a system by determining which power conservation action to employ. For example, and as described below, power intensive jobs may be grouped or distributed to meet the power requirements. If, for example, the power requirement is to avoid spikes over a given threshold (e.g., to stay with a total available power level), then power intensive data storage operations may be distributed among various cells so that no one cell generates a power spike.

Alternatively or additionally, two or more jobs may be grouped to ensure that power requirements are below a threshold (e.g., a small data storage job of ten kilobytes is grouped with a larger four-gigabyte job so that a single drive is only powered up once). The system may consider other factors within the building when scheduling jobs, such as scheduling jobs when air conditioning or heating is placed in a more power conservative mode so that additional power in the building may be used for data storage operations. Some devices in the building may even be cycled off, such as auxiliary components 112, in order to meet the power requirements. For example, the global manager may adjust the environmental components or industrial components to conserve power from those components and allow it to be applied to data storage components. Alternatively, because critical data storage operations might be more important, the global manager may actually adjust the air conditioning within a data center to increase cooling to ensure that this important data storage operation is performed with a lower likelihood of errors. Or air conditioning in other areas of the building or campus may be turned off (or thermostats adjusted higher) to compensate for the increased power needs of the data center.

For report (2) that provides information on running operations, the global system manager may monitor ongoing operations and make any necessary adjustments. For example, power requirements for the current data storage operations may be near a given threshold because unexpectedly hot weather has caused a greater demand for cooling within the building. Therefore certain data storage jobs that can be moved to another day are so deferred. In this example, the system checks the storage policy to determine which jobs may be moved. Further details on flexibly or dynamically moving jobs within a schedule may be found in the assignee's U.S. patent application Ser. No. 12/141,776, filed Jun. 18, 2008, entitled "Data Protection Scheduling, such as Providing a Flexible Backup Window in a Data Protection System."

Considering the example of report (3), on completed operations, the system may employ such data to help produce better power consumption forecasts so as to provide better future power conservation decisions. For example, the building may have been recently renovated and insulated making the previously predicted power requirements for heating and cooling different, and thereby freeing up additional power resources that may be employed in future data storage jobs.

Alternatively or additionally, the system may employ such data to help better predict future use of system components, and thus project future power requirements. Overall, while the word "report" is used herein, it is intended to represent any data or metrics that the system may employ to help inform further actions or take next steps. Thus, such reports can include not only a printed or displayed report provided to an administrator, but also a command or data structure provided to or employed by the global system manager 100 or local manager 109, so that the manager(s) can automatically respond in an appropriate manner to manage and make power efficient decisions.

In step 730, the system may determine a power conservation action to be performed, and the routine 700 ends. Referring back to step 620 of FIG. 6, the system determines an action based upon the comparisons described with respect to FIG. 7A, and proceeds to step 630.

Figure 7B:
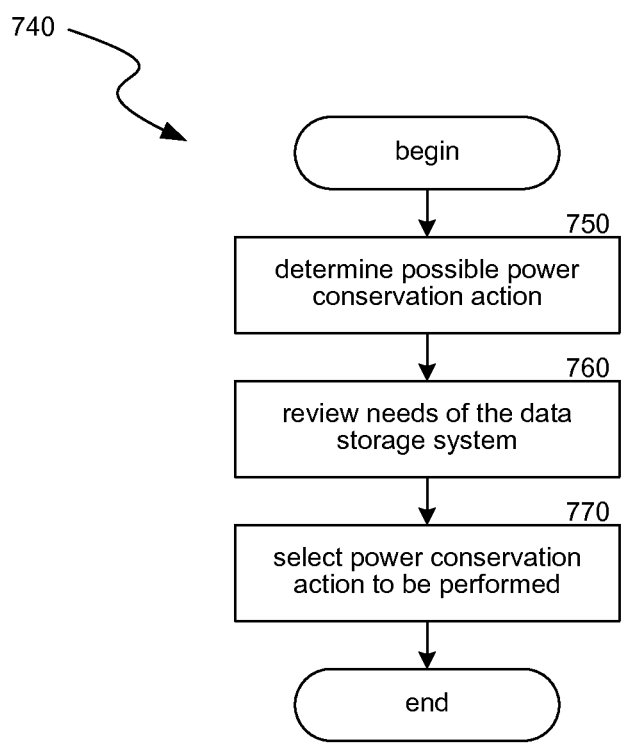
FIG. 7B is a flow diagram illustrating a routine for performing an action.

Referring to FIG. 7B, a flow diagram illustrating a routine 740 for performing a power conservation action is shown. In step 750, the system determines that an action is to be performed. The system, in step 760, reviews the needs of the storage operation and the power requirements. For example, the system receives information that a data storage operation at a given cell will not complete in time and that a power threshold is about to be reached (because other components in the building are unexpectedly drawing greater power). For example, the global system manager 100 may have stored in the index database 132 a schedule of jobs to be preformed and estimated completion times for those jobs and/or an available backup window in which to complete those jobs. The manager can determine that the backup window is nearing its end, but that one or more jobs are still in the queue to be performed at a given cell. Further, the manager can obtain power consumption feedback data on the power usage of the components or, at a coarser level, simply receive energy consumption data from a site or building within the cell to recognize that a power threshold may be exceeded. (Alternatively, or additionally, the manager may employ an index or table of estimated power consumption for given devices, for given data storage operations, etc.)

In step 770, the system performs a determined action. In this example, the system may transfer some of the waiting jobs at the given cell to another cell associated with another building in order to off-load power to another building that has a greater capacity or to create a buffer before reaching the power threshold, and thereby complete the data storage operation. In other examples, the system may perform actions that modify or redistribute system resources before the next scheduled data storage operation. Alternatively or additionally, the system may power down, adjust thermostats, or otherwise free up additional power within the building or cell as needed.

Figure 8:
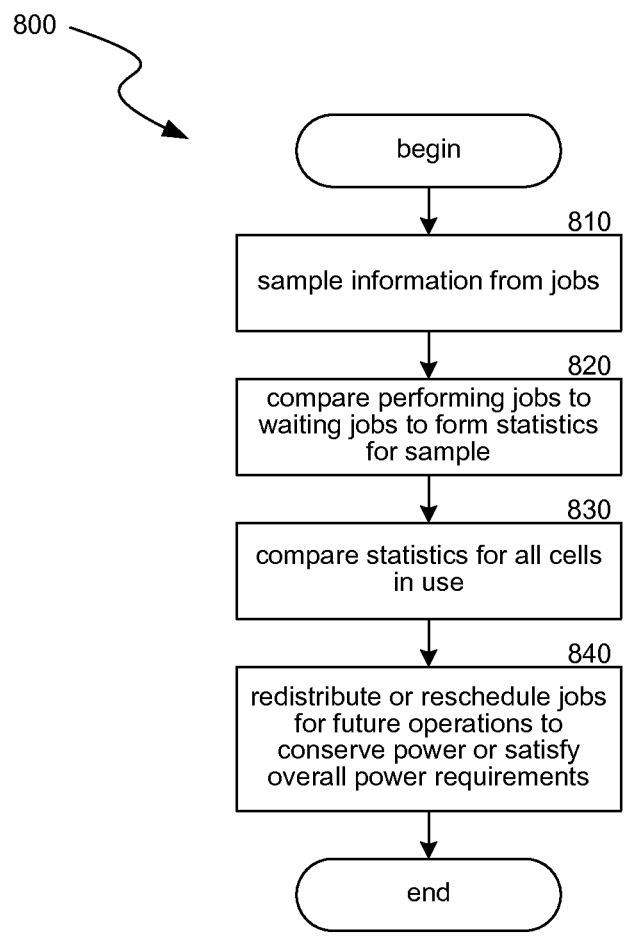
FIG. 8 is a flow diagram illustrating a routine for redistributing data transfer jobs.

Referring to FIG. 8, a flow diagram illustrating a routine 800 for redistributing data storage jobs is shown. Routine 800 illustrates an example of load redistribution based on a sampling of load statistics. In step 810, the system samples job information from cells used in storage operations. The system may obtain this information from the load report. In step 820, the system defines a job usage factor for each cell. A job usage factor may be a metric to indicate how frequently a data storage device, network device, system resource, cell, etc., is used within the enterprise, such as the number of jobs performed within a backup window as a function of total number of jobs that could be performed. In step 830, the system compares the job usage factors for each cell and determines a distribution pattern for the cells. The system can determine power or energy load requirements for cells or drives based on historical data from the cells, manufacturer's data for a particular drive, etc.

For example, two cells are in use for daily data storage operations: cell A and cell B. The system receives reports for each cell, showing job usage factors for a number of sampling periods. In this example, the reports show cell A with a job usage factor of 40 percent (two of five jobs running) and cell B with a job usage factor of 100 percent (five of five jobs running). Based on these statistics, the system may determine that cell B can handle 2.5 times as many jobs as cell A. Moreover, cell B may generate more heat than cell A, which may not only lead to greater wear on drives and resources in cell B, but can also increase the power requirements of cell B because of the less efficient operation of drives and resources in cell B, the greater need for cooling in cell B, etc., all of which increase the power demands of cell B. By thus shifting jobs to cell A, power requirements of cell B are reduced.

Referring back to FIG. 8, routine 800 proceeds to step 840 and redistributes or reschedules jobs of future storage operations using cells A and B. For example, if the next daily data store is to transfer 140 MB of data, the system sends 100 MB to cell B and 40 MB to cell A.

In some examples, administrators may set the types of information the system samples. Administrators, or developers of the system, may define mathematical models based on their needs. Additionally, the system may use mathematical models to develop reports on a variety of different data transfers or other storage activities. The system may gather not only the data described herein, but various other parameters useful in forecasting or conserving power usage, such as the temperature within various rooms in the building(s), weather data, thermostat set point data, scheduled operations of industrial components 106, schedule usage or environmental components 104, building operation data (e.g., holidays, worker shift times, etc.), historically busy (and power intensive) times, etc. This information is used by the system to determine whether current or scheduled data storage operations are below the established power requirements. When they are not, the system reschedules those data storage operations capable of being rescheduled, adjusts the behavior of other components in the building, and/or performs other actions described herein or known to those skilled in the art.

Figure 11:
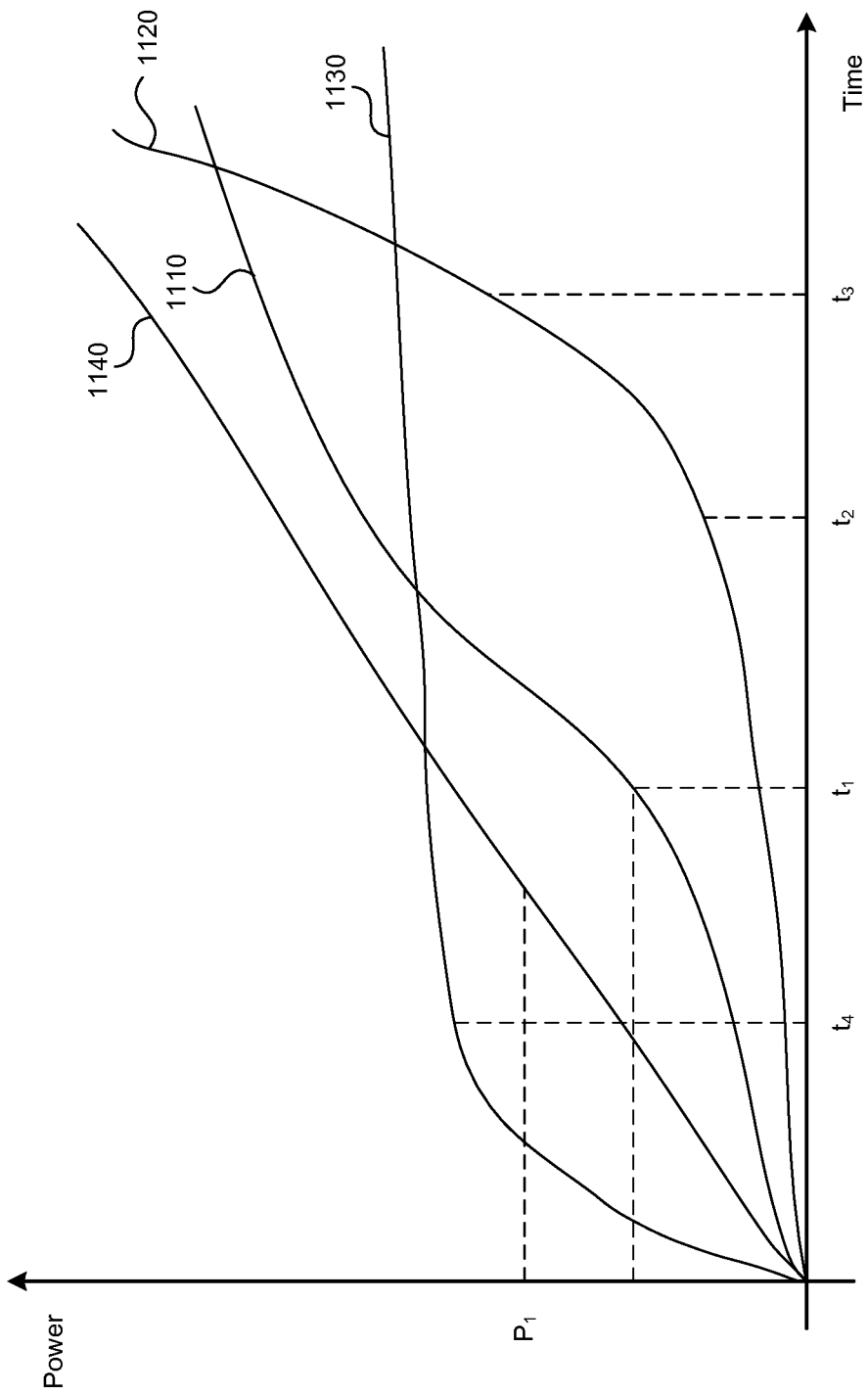
FIG. 11 shows power curves for data storage devices.

As noted herein, the global manager implements power conservation actions in part based on known performance of data storage components. FIG. 11 shows an example of several different power curves that may be applicable to various data storage components. For example, power curve 1110 shows that this component has relatively low power requirements until approximately time $t_1$ at which point the rate of change of power over time starts to rise more quickly. Knowing this, the global manager may attempt to conserve power and operate the device associated with power curve 1110 until approximately time $t_1$, since after that the power requirements start to rise more significantly. Likewise, a second device may have a power curve similar to curve 1120, where the power is quite minimal, but then begins to rise and approach an asymptotic value. By powering down that device within a time window between $t_2$ and $t_3$, and preferably before time $t_3$, the system can realize power savings.

Other power curves are of course possible. For example, another device, such as a tape drive, may have significant initial power requirements upon start up, but may then have fairly constant power requirements thereafter (curve 1130). Therefore, the system may wish to only power up that device if a job for that device extends beyond a time threshold $t_4$. Any job lasting less than that would not make sense from a power conservation perspective, and thus a job for that device should be either provided to another device already in operation or rescheduled for a time when additional jobs would cause the cumulative time to extend beyond $t_4$.

Some devices may have a more linear curve like curve 1140, in which case the system may establish a power threshold $P_1$ whereby that device is only powered for an amount of time until the power threshold $P_1$ is reached, and then the device is powered off and other devices are employed. Overall, knowing the various power curves of the devices within all cells and having the flexibility to move jobs between devices and among cells, the global manager is able to realize greater power conservation than can be realized by focusing on only a single piece of hardware. The index database 132 (and/or local manger 109) can store such power curves, store tables, which include relevant data points of such curves, or both. Of course, such power curves are only one of the many energy consumption characteristics that the system employs to realize greater power conservation. Other characteristics can include geographic location of such devices, periodic (e.g., monthly) cost of electricity at such locations, predicted weather at such locations, anticipated system road requirements (e.g., scheduled of upcoming data storage jobs), etc. When determining the time to complete a data storage operation or job, the system may consider not only the total size of the job (e.g. in MB or GB), but also the data processing speed of components specified or required to perform the job (e.g., MB/sec). Such characteristics can include any metrics or variables described herein as well as other data.

Figure 14:
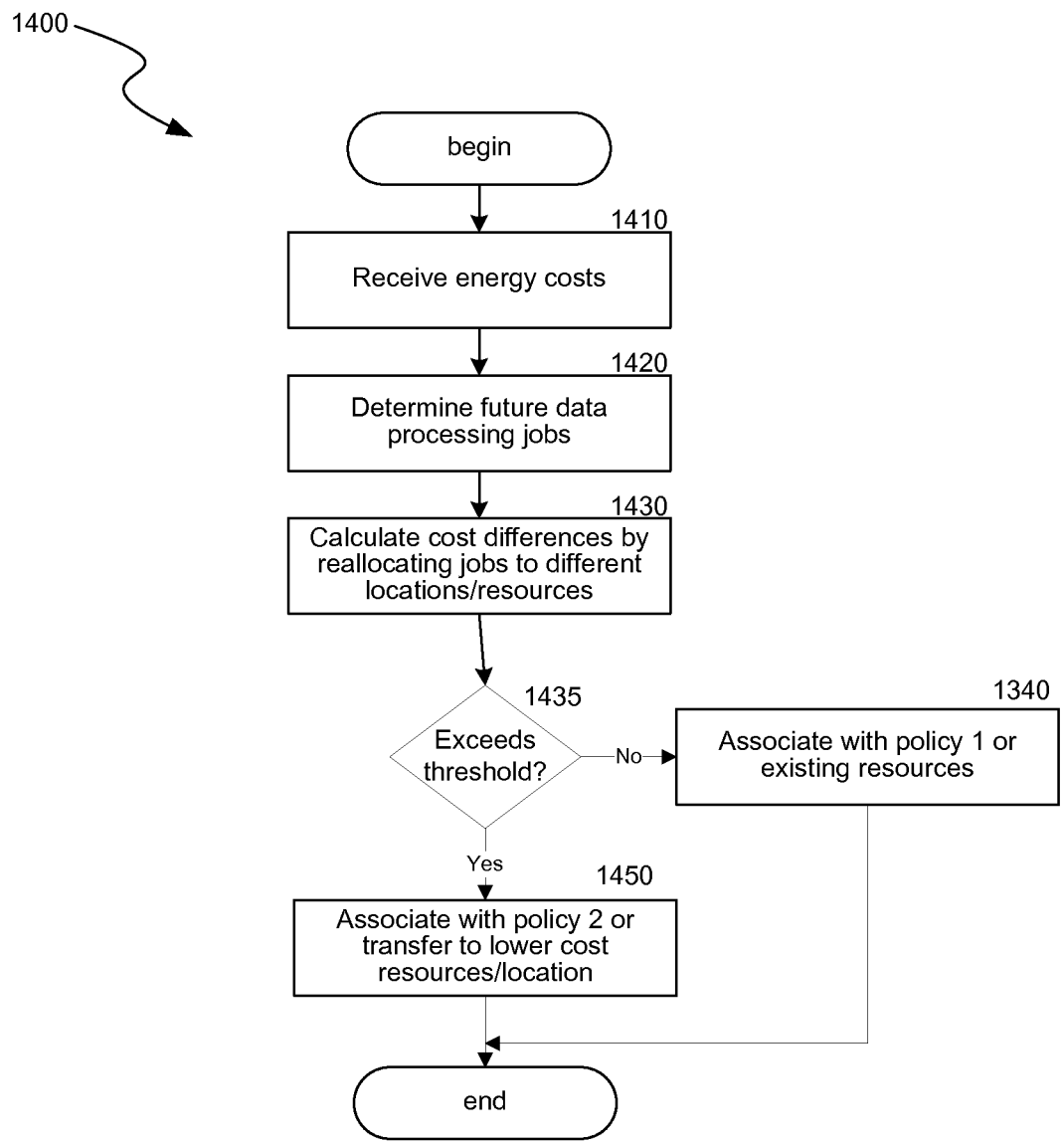
FIG. 14 is a flow diagram illustrating a routine for gathering data and making data processing decisions to reduce energy costs.

Referring to FIG. 14, a routine 1400 for gathering energy-related data and making dynamic and intelligent data processing decisions begins in block 1410 where the system receives energy costs. For example, the system may gather current and/or predicted energy costs for various locations within the enterprise, which can include energy costs in other countries and other cities where the data processing components are distributed nationally or internationally and connected via one or more networks. The system may also gather other energy-related data from third-party data sources, such as current or forecasted weather at each of the specified enterprise locations.

In block 1420, the system determines or gathers data on future data processing jobs. For example, as noted herein, the system may gather data on upcoming data copying jobs to be performed at regularly scheduled intervals (e.g., a full backup being performed during the last weekend of every calendar month). This gathered data can also include other information noted herein, such as estimated total data size to be copied (such as in hundreds of gigabytes), energy cost per megabyte (e.g. watts/sec/MB), energy profile data associated with data processing devices (such as that provided by the system of FIG. 13), and so forth.

In block 1430, the system calculates cost differences to reallocate jobs to different locations, to different data processing resources, or both. In other words, the system calculates a cost or other metric for each data processing job (or each job over a given time, energy cost, or size threshold) to help determine whether that job should be performed as planned or reallocated elsewhere. For example, a large full backup performed once each month by the enterprise may be best handled in a jurisdiction having lower energy costs (even at a data storage location in another country) if energy costs are sufficient low enough and other factors so require. Other factors can include a risk factor that data may be lost, a backup window may be missed, etc. If the calculated cost difference exceeds a threshold (block 1435), then the job is allocated to a lower cost location, to lower cost resources, or both (block 1450); otherwise, the job is associated with the existing resources (block 1340). Alternatively or additionally, the system can allocate a different storage policy if the calculated cost exceeds the threshold (block 1450), or associates the existing, default or other policy to that job (block 1440). While this example refers to data storage jobs, any other data processing jobs or other manipulation of data within the enterprise can be considered and managed by this routine.

As noted above, the system uses the global manager or server to set policies for the overall system. For example, referring back to FIG. 2, there may be many different storage and/or schedule policies set in cells 220 and 230 of the storage operations level 210. For policies used in both cells, the system may set such policies (or, filters) at the global level 250, via global manager 261. In these cases, the system communicates these filters to the lower level storage cells. The system may communicate globally set filters to one cell, a selection of cells, or all cells within a data storage system.

Figure 9:
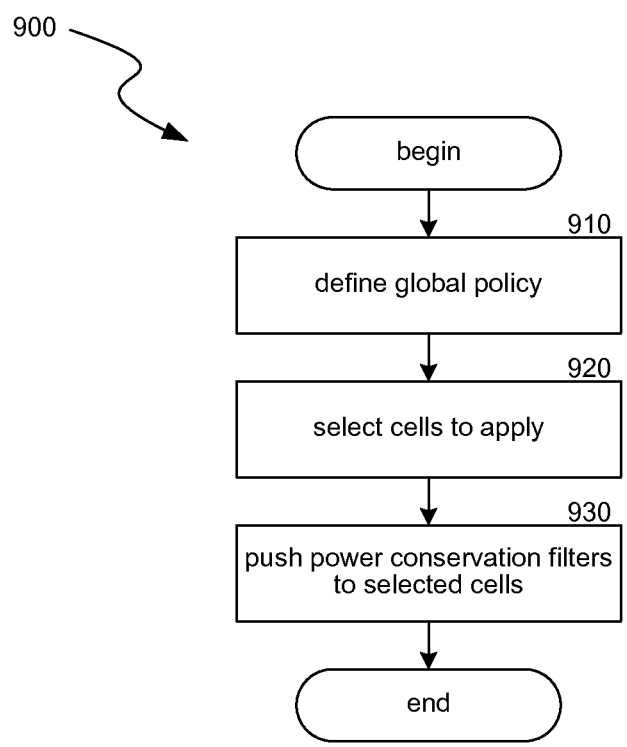
FIG. 9 is a flow diagram illustrating a routine for setting global power control filters.

Referring to FIG. 9, a flow diagram illustrating a routine 900 for setting global filters is shown. In step 910, a system administrator or information from the system defines a global policy, such as a storage policy or schedule policy that adjusts power conservation for building 102. In some cases, the system may use information determined from the reports described above to determine the filter. Alternatively or additionally, the system may use other information to determine the filter, such as current and forecasted weather conditions indicating a heat spell that may require greater than expected power requirements for air conditioning. The system may algorithmically correlate temperature and internal conditions to kilowatts per gigabyte, and the like. The system provides a global view of environmental conditions at the facility, plant, campus, building, enterprise, or other level, as well as a view of data capacity and other requirements. While the term "filter" is used herein, any parameter may be employed.

In step 920, the system selects where to implement, or push, the filter. In some cases, the system pushes the filter to all cells within the system. In some cases, the system selects a proper subset of the cells and pushes the filter to the proper subset of cells. In step 930, upon selection of the cells (or an automatic predetermination to select all cells), the system pushes the filters to the selected cells.

Thus, the system may define power conservation policies at many servers (tens or hundreds) without actually setting the policies at each individual server. Example policies include storage policies, schedule policies, sub-client policies, and other policies or actions noted herein to conserve power. Filters and policies may be modified at the cell or global level and reapplied during or after storage operations (such as described herein). For example, the system may use energy load reports to set a policy that redistributes the resources of a storage operation and may then use the global filters to implement the policy. The system may employ a weighted node modeling tree to model entities for each power consumer within the system.

As noted above, the system may organize data storage devices into two or more efficiency or power consumption tiers, with power efficient devices, such as solid state memory (including flash memory) in one tier, with power hungry devices in at least a second tier, such as automated tape storage libraries. The system can model or display such tiers of the entire data storage enterprise. The system can provide a topology of network devices and resources, with power consumption metrics associated with each component, including not only the data storage components (disk drives, tape drives, etc.), but also other system components, including network components (routers, switches, hubs, etc.). Such a topology can model network pathways, hierarchy or tiers of hardware within the enterprise, and report back metrics from such hardware (or operations on the hardware).

Thus, by classifying data storage components within tiers, the global system manager 100 can manage pools of data storage resources in different tiers to reduce power consumption. The manager can automatically distribute and migrate or transfer data initially to power efficient storage devices (solid state, RAMdisk, etc.), and minimize access to data storage devices and other tiers (e.g., disk) (e.g., just a bunch of disks (JBOD), tape, etc.).

The system may provide a single power view or metric associated with some or all of the enterprise or the topology as a whole, so that a single value can be presented to a user to indicate the overall power consumption within the enterprise (or subset of components in the enterprise). Such a single view can effectively operate as a speedometer or fuel gauge to represent instantaneous power consumption in the enterprise (while other metrics provided can show a graph or bar chart of the power consumption of the enterprise over time). Further details regarding processes for obtaining a unified system view and an associated value may be found in the assignee's U.S. Pat. No. 7,346,751, issued Mar. 18, 2008, entitled "Systems and Methods for Generating a Storage Related Metric," U.S. Pat. No. 7,343,453, issued Mar. 11, 2008, entitled "Hierarchical System and Method for Providing a Unified View of Storage Information," and U.S. Pat. No. 7,343,356, issued Mar. 11, 2008, entitled "Systems and Methods for Storage Modeling and Costing."

Figure 10:
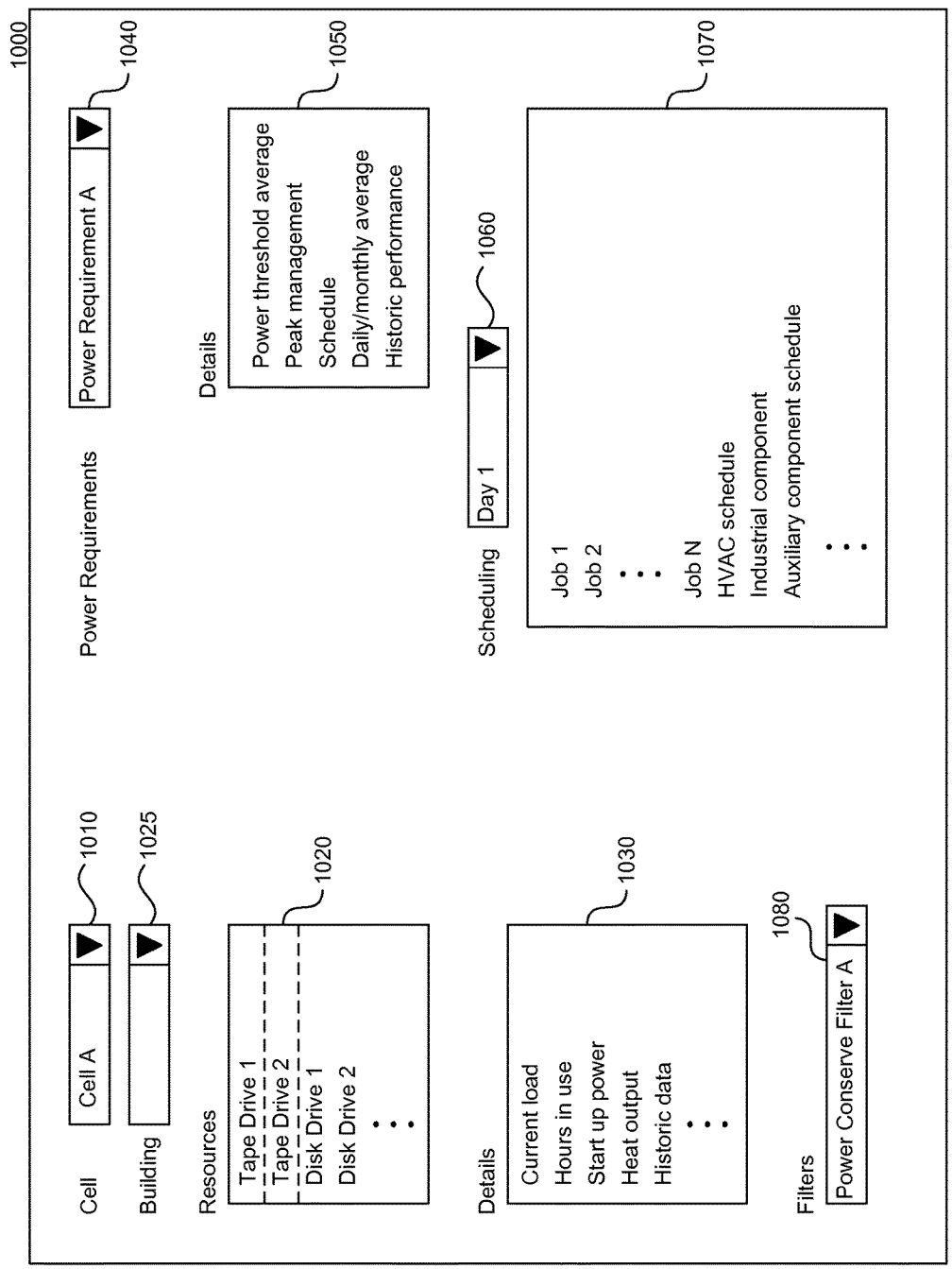
FIG. 10 is an example of a display illustrating user interface screens.

FIG. 10 shows an example of a user interface screen 1000 that allows an administrator or user to view or adjust parameters within the system, including adjusting storage policies, scheduled policies, or other policies affecting power consumption within the system. The screen of FIG. 10 may be implemented in any of various ways, such as in C++ or as web pages in XML (Extensible Markup Language), HTML (HyperText Markup Language) or any other scripts or methods of creating displayable data, such as the Wireless Access Protocol (WAP). The screen or web page provides facilities to present information and receive input data, such as a form or page with fields to be filled in, drop-down menus or entries allowing one or more of several options to be selected, buttons, sliders, hypertext links, or other known user interface tools for receiving user input. When implemented as web pages, the screens are stored as display descriptions, graphical user interfaces, or other methods of depicting information on a computer screen (e.g., commands, links, fonts, colors, layout, sizes and relative positions, and the like), where the layout and information or content to be displayed on the page is stored in a database typically connected to a server. While certain ways of displaying information to users is shown and described, those skilled in the relevant art will recognize that various other alternatives may be employed. The terms "screen," "web page," and "page" are generally used interchangeably herein. A "display description," as generally used herein, refers to any method of automatically displaying information on a computer screen in any of the above-noted formats, as well as other formats, such as email or character/code-based formats, algorithm-based formats (e.g., vector generated), or matrix or bit-mapped formats.

A cell drop-down menu 1010 allows the user to select one of multiple cells within the data storage system and have the associated resources displayed in box 1012. Alternatively, the user can select one or more buildings from the drop-down menu 1025 and have the associated resources displayed in box 1020. As shown, cell A is selected, which includes tape drive 1, tape drive 2, disk drive 1, disk drive 2, as well as other resources not shown. Here, tape drive 2 has been highlighted in box 1020, and details of the drive are shown in box 1030, such as the current load on that drive, total hours in use, the startup of power requirements for that drive, heat output, historical data with respect to that drive, and so forth. By selecting any of the displayed items in box 1030, a pop-up window is displayed to provide further information regarding each of those listed items.

Screen 1000 also allows the administrator or establish power requirements. A power requirements drop-down menu 1040 allows the administrator to select one of several previously defined power requirements (or to create new requirements) with the subsequent details displayed in box 1050. As shown, Power Requirement A has an average power threshold, details on power peak management to avoid power spikes, schedule for activities, a daily or monthly power consumption average, historical performance for the power requirement, and so forth. By selecting any of the displayed items in box 1050, a pop-up window (not shown) will be displayed to provide further information regarding the selected item, and to allow the administrator to make any appropriate adjustments. In general, any such pop-up windows permit the administrator to make changes to displayed items.

The administrator may also view or adjust the scheduling of data storage jobs, as well as the power consumption of other components within one or more buildings by selecting a day from a drop-down menu or calendar 1060, which causes the details of any power consumptive operation occurring on that date to be displayed in box 1070. As shown, on Day 1, jobs 1 through n are to be performed. By selecting any of these jobs, details may be provided in a pop-up window (not shown). Likewise, the administrator may also select to display other power consumptive operations to be performed on that day, by selecting "HVAC Schedule," "Industrial Component Schedule," "Auxiliary Component Schedule," as well as other schedules not shown.

A Filters section includes a drop-down menu 1080 that permits the administrator to select one or more power conservation filters, parameters, etc., that can be applied to groups of two or more cells, as noted herein. The user interface screen 1000 is only an example and many other options or adjustments may be provided, as those skilled in the relevant will appreciate. Indeed, an initial screen (not shown) may provide an administrator with two choices. The first choice would be to allow the administrator to manage some or all of the parameters associated with power conservation, such as the options shown in screen 1000. A second option would simply be a single check box, button, or other user interface element that allows the administrator to simply have the system automatically consider power conservation when executing data storage operations, implementing storage policies, or performing other data storage operations within the enterprise. Thus, the system described herein could be both very flexible, allowing the administrator to manipulate various parameters, as well as very simple, providing a simple, automated option where the system optimizes data movement and storage operations to reduce power. Thus, the system can both be very flexible as well as easy to implement. Further, the system need not provide all the options shown in screen 1000, but can provide the administrator with a subset of such choices, as well as provide additional choices.

FIG. 12, an example of a schedule showing jobs and associated cells is shown for Day 1. In addition to the power requirements and power consumption/curve data for devices, the system prioritizes jobs based on other factors including the size of the jobs, the scheduling windows, and other data. (Other data can include the type of job to be performed (e.g., snapshot, full backup, incremental backup, etc.) or other data that may be obtained through data classification, described herein). As shown, job 1 has been placed first in order or queue for cell A because it has no window available; it must be performed on Day 1. In other words, job 1 is a high-priority job that must be completed at its schedule time. Likewise, job 6, which is of smaller size, is placed second. The system places job 4 third since it has a four-day window, but is on its third day within that window (e.g., the job has already been deferred two previous days).

Job 2 is fourth (the first of two days within its window), and job 3 has been combined with it. Note that job 3 was assigned to cell B, but was reassigned by the system to cell A. This may be due to the fact that cell B spans buildings 1 and 2, and power requirements in building 2 may be such that it is preferable for the system to move job 3 to another cell. Jobs 5 and 7 currently have a "hold" or "H" status. Job 5, for example, is a small job (15 megabytes), is in building 2 (which could have other power constraints), and is only in its first of five days of available window. Job 7 on the other hand is a large job (30 gigabytes) spans buildings 1 and 2, and is only in its first of five-day window. Job 7 may well be a candidate for being distributed among multiple cells, whereas job 5 can simply be combined with another job. The system of course may dynamically change jobs as power requirements change, as noted herein.

As is evident from the above Detailed Description, the system employs a software-based method of conserving power, as opposed to relying on individual hardware components. Since cells are logical groupings of resources, including hardware resources, such logical groupings can be modified or redefined as necessary. Further, additional hardware resources may be added to or taken from a cell, and the system can quickly or even automatically compensate for such changes in order to meet the predetermined power conservation policies as described herein. The system described herein can manage data storage not simply on a cost vs. speed basis, but on a cost vs. consumption basis.

Additional System Improvements

The system may monitor and control (directly or indirectly) operation of components within a data storage device. For example, with a disk drive, the system may command a spindle motor in a disk drive to spin up a disk, which consumes more power than the steady-state operation of that motor. Knowing that there is some hysteresis, the system may command a disk drive to not spin down or turn off the motor unless there has been no activity for a set number of N minutes. Alternatively or additionally, more sophisticated algorithms based on heuristics may be employed to help minimize the spin-up of disks (by energizing the spindle motor). To minimize spin-up, the system caches data and may include both a write cache as well as a read cache, which can be implemented in any number of solid state, non-volatile arrays, such as battery backed-up RAM, Flash, etc. Of course, the size of the cache must be large enough to ensure that no data is lost.

The system minimizes the frequency of access to the physical disk and, where possible, read/write requests are cached and aggregated to concentrate them onto a single disk, requiring the spin-up of a single spindle motor. The system can employ a log-structured file system for writing files to Flash or other non-volatile memory caches, which can further minimize disk seeks, and thus further reduce power consumption. This can further maximize the physical and temporal locality of references. A log-structured file system could eliminate random access patterns on disks and allow a disk controller (or a logical volume manager (LVM)) to control distribution of reads, and especially writes, to the disk. Alternatively or additionally, the system can employ virtualization, so that block-level virtualization equivalents can be performed by the system.

As noted herein, the system may categorize or tier the data storage or other system components based on power efficiency or power consumption. As also noted herein, certain devices may have different power profiles than other similar devices. One example of such a difference would be in the case of disk drives that have different disk sizes. Large disks may be more power-efficient per unit of storage, if all disks and read/write operations are being executed or performed continuously. With ample caching and RAID-type (redundant arrays of in-extensive disks) data distribution, however, smaller diameter disks may be preferable. With random access patterns across a set of disks, but with large diameter disks, the probability that any given input/output request would land on the disk is higher (with more "surface area") since all disks may be required to be online for even modest levels of data traffic to or from the disk (i.e, reads/writes). With smaller diameter disks, the likelihood that any one disk will be needed is reduced proportionately, but, on the other hand, there may be less necessity for aggregating operations or "batching" input/output operations to the same disk (localizing reference to portions of a disk).

Alternatively or additionally, the system can enhance the physical locality of references by employing redundancy. Using existing replication strategies originally designed for data protection (e.g., RAID 0+1), the system can increase the probability that the next block required for an operation (or a copy of that block) happens to be on a recently accessed disk (as associated spindle motor). Redundant copies are costly in terms of disk space, but if an overriding concern of the system is to reduce power consumption, then such a trade-off can be worthwhile.

Alternatively or additionally, the system can further optimize fan motor operations within the data storage device. For example, the global system manager, local manager, or other system components can let fans be activated or deactivated as needed based on feedback from a temperature sensor in the disk chassis or other location within a disk drive. Increased cooling will be required by disks that are spinning, so cooling power is dependent on disk access. Thus, localizing disk access to a minimal set of spindles localizes the requirement for cooling and cooling power, thereby minimizing a need to not only selectively operate the spindle motors, but also the fan motors. Manufacturer data, feedback from monitoring operation of disks, empirical testing, and so forth, can help further determine optimization of such drives and the components within such drives (e.g., some drives may operate more efficiently with a single, larger fan and motor, while another may work best with multiple, smaller motors and fans).

A large data storage enterprise, such as one with enterprise-class disk arrays, network attached storage (NAS) systems, multiple data storage tape libraries, and so forth, can afford significant opportunities for the system described herein to implement power conservation. For example, such a large enterprise system allows the system to concentrate on reducing energy consumed by less-frequently accessed data and less-frequently used data storage devices. Further, by analyzing reports generated by the system, the global system manager 100 can identify data access patterns that tend to cluster or focus around specific resources, along organizational or administrative groups, periodically around specific backup schedules, and so forth. For example, the manager can recognize that participants in the same project or work group are more likely to share a common database or file system. The system can thus segment data storage resources along organizational domains to improve or concentrate/aggregate caching of data. Indeed, many of the operations described herein provide not only methods for reducing power consumption, but also concentrate active user data on a smaller number of drives to reduce the amount of unused drives or disk/storage capacity, which may help an organization to reduce required data storage resources.

CONCLUSION

Systems and modules described herein may comprise software, firmware, hardware, or any combination(s) of software, firmware, or hardware suitable for the purposes described herein. Software and other modules may reside on servers, workstations, personal computers, computerized tablets, PDAs, and other devices suitable for the purposes described herein. In other words, the software and other modules described herein may be executed by a general-purpose computer, e.g., a server computer, wireless device or personal computer. Those skilled in the relevant art will appreciate that aspects of the invention can be practiced with other communications, data processing, or computer system configurations, including: Internet appliances, hand-held devices (including personal digital assistants (PDAs)), wearable computers, all manner of cellular or mobile phones, multi-processor systems, microprocessor-based or programmable consumer electronics, set-top boxes, network PCs, mini-computers, mainframe computers, and the like. Indeed, the terms "computer," "server," "host," "host system," and the like, are generally used interchangeably herein, and refer to any of the above devices and systems, as well as any data processor. Furthermore, aspects of the invention can be embodied in a special purpose computer or data processor that is specifically programmed, configured, or constructed to perform one or more of the computer-executable instructions explained in detail herein.

Software and other modules may be accessible via local memory, via a network, via a browser or other application in an ASP context, or via other means suitable for the purposes described herein. Examples of the technology can also be practiced in distributed computing environments where tasks or modules are performed by remote processing devices, which are linked through a communications network, such as a Local Area Network (LAN), Wide Area Network (WAN), or the Internet. In a distributed computing environment, program modules may be located in both local and remote memory storage devices. Data structures described herein may comprise computer files, variables, programming arrays, programming structures, or any electronic information storage schemes or methods, or any combinations thereof, suitable for the purposes described herein. User interface elements described herein may comprise elements from graphical user interfaces, command line interfaces, and other interfaces suitable for the purposes described herein. Screenshots presented and described herein can be displayed differently, as is known in the art, to input, access, change, manipulate, modify, alter, and work with information.

Examples of the technology may be stored or distributed on tangible computer-readable media, including magnetically or optically readable computer disks, hard-wired or preprogrammed chips (e.g., EEPROM semiconductor chips), nanotechnology memory, biological memory, or other data storage media. Computer implemented instructions, data structures, screen displays, and other data under aspects of the invention may be distributed over the Internet or over other networks (including wireless networks), on a propagated signal on a propagation medium (e.g., an electromagnetic wave(s), a sound wave, etc.) over a period of time, or they may be provided on any analog or digital network (packet switched, circuit switched, or other scheme).

Unless the context clearly requires otherwise, throughout the description and the claims, the words "comprise," "comprising," and the like, are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above Detailed Description of examples of the technology is not intended to be exhaustive or to limit the invention to the precise form disclosed above. While specific embodiments of, and examples for, the invention are described above for illustrative purposes, various equivalent modifications are possible within the scope of the invention, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed in parallel, or may be performed at different times.

The teachings of the technology provided herein can be applied to other systems, not necessarily the system described above. The elements and acts of the various embodiments described above can be combined to provide further examples. Any patents and applications and other references noted above, including any that may be listed in accompanying filing papers, are incorporated herein by reference. Aspects of the invention can be modified, if necessary, to employ the systems, functions, and concepts of the various references described above to provide yet further examples of the technology.

These and other changes can be made to the invention in light of the above Detailed Description. While the above description describes certain embodiments of the invention, and describes the best mode contemplated, no matter how detailed the above appears in text, the invention can be practiced in many ways. Details of the system and method for classifying and transferring information may vary considerably in its implementation details, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific embodiments disclosed in the specification, unless the above Detailed Description section explicitly defines such terms. Accordingly, the actual scope of the invention encompasses not only the disclosed embodiments, but also all equivalent ways of practicing or implementing the technology under the claims. While certain aspects of the technology are presented below in certain claim forms, the inventors contemplate the various aspects of the technology in any number of claim forms. For example, while only one aspect of the technology is recited as embodied in a computer-readable medium, other aspects may likewise be embodied in a computer-readable medium. Accordingly, the inventors reserve the right to add additional claims after filing the application to pursue such additional claim forms for other aspects of the technology.

From the foregoing, it will be appreciated that specific embodiments of the invention have been described herein for purposes of illustration, but that various modifications may be made without deviating from the spirit and scope of the invention. Accordingly, the invention is not limited except as by the appended claims.

I claim:

1. A method in a computing system for performing a power conservation action within a building or among multiple buildings, wherein the power conservation action is related to data processing operations, the method comprising:

receiving information related to data processing operations,
wherein the information related to data processing operations comprises information related to data processing operations to be performed, and information related to data processing operations completed, and
wherein the information related to data processing operations further comprises:

information related to power consumption forecast information, and information related to delayed storage operations at one or more data storage resources, or to available time windows for delaying storage operations;

receiving power consumption information related to at least one data processing component in the building;

identifying one or more power conservation actions to be performed, wherein the power conservation actions to be performed are based on the information related to data processing operations and the power consumption information;

selecting one or more of the identified power conservation actions based on the power consumption information and the information related to data processing operations; and changing a state of the computing system by performing the selected one or more of the identified power conservation actions, wherein at least one of the power conservation actions includes adjusting the usage of electrical components within a building.

2. The method of claim 1 wherein the computing system includes a hierarchical data storage system comprising two or more data storage cells, wherein each data storage cell contains a separate data storage resource capable of performing storage operations in the data storage system, and wherein each data storage resource has known estimatable power consumption information.

3. The method of claim 1 wherein the one or more power conservation actions comprises rescheduling or combining jobs from a queue to another day or a later time within an available time window.

4. The method of claim 2 wherein the one or more power conservation actions comprises reorganizing the data storage resources for future data storage operations.

5. The method of claim 2 wherein the one or more power conservation actions comprises shifting one or more data storage jobs to another data storage resource.

6. A computing system for performing a power conservation action within a building or among multiple buildings, the system comprising:

at least one processor;

memory coupled to the at least one processor, wherein the memory stores contents that, when executed by the at least one processor performs a method of:

receiving information related to data processing operations, wherein the information related to data processing operations comprises information related to data processing operations to be performed, and information related to data processing operations completed, and wherein the information related to data processing operations further comprises:

information related to power consumption forecast information, and information related to delayed storage operations at one or more data storage resources, or to available time windows for delaying storage operations;

receiving power consumption information related to at least one data processing component in the building;

identifying one or more power conservation actions to be performed, wherein the power conservation actions to be performed are based on the information related to data processing operations and the power consumption information;

selecting one or more of the identified power conservation actions based on the power consumption information and the information related to data processing operations; and changing a state of the computing system by performing the selected one or more of the identified power conservation actions, wherein at least one of the power conservation actions includes shutting off or cycling the usage of electrical components within a building or within a data storage computing system.

7. The system of claim 6 wherein the computing system includes a hierarchical data storage system comprising two or more data storage cells, wherein each data storage cell contains a separate data storage resource capable of performing storage operations in the data storage system, and wherein each data storage resource has known estimatable power consumption information.

8. The system of claim 6 wherein the one or more power conservation actions comprises rescheduling or combining jobs from a queue to another day or a later time within an available time window.

9. The system of claim 7 wherein the one or more power conservation actions comprises reorganizing the data storage resources for future data storage operations.

10. The system of claim 7 wherein the one or more power conservation actions comprises shifting one or more data storage jobs to another data storage resource.

11. A tangible non-transitory computer-readable medium carrying instructions to perform a method in a computing system for performing a power conservation action within a building or among multiple buildings, wherein the power conservation action is related to data processing operations, the method comprising:

receiving information related to data processing operations, wherein the information related to data processing operations comprises information related to data processing operations to be performed, and information related to data processing operations completed, and wherein the information related to data processing operations further comprises:

information related to power consumption forecast information, and information related to delayed storage operations at one or more data storage resources, or to available time windows for delaying storage operations;

receiving power consumption information related to at least one data processing component in the building;

identifying one or more power conservation actions to be performed, wherein the power conservation actions to be performed are based on the information related to data processing operations and the power consumption information;

selecting one or more of the identified power conservation actions based on the power consumption information and the information related to data processing operations; and causing a change in a state of the computing system by performance of the selected one or more of the identified power conservation actions,
   wherein at least one of the power conservation actions includes adjusting the usage of electrical components within a building.

12. The non-transitory computer-readable medium of claim 11 wherein the computing system includes a hierarchical data storage system comprising two or more data storage cells, wherein each data storage cell contains a separate data storage resource capable of performing storage operations in the data storage system, and wherein each data storage resource has known estimatable power consumption information.

13. The non-transitory computer-readable medium of claim 11 wherein the one or more power conservation actions comprises rescheduling or combining jobs from a queue to another day or a later time within an available time window.

14. The non-transitory computer-readable medium of claim 12 wherein the one or more power conservation actions comprises reorganizing the data storage resources for future data storage operations.

15. The non-transitory computer-readable medium of claim 12 wherein the one or more power conservation actions comprises shifting one or more data storage jobs to another data storage resource.

16. A computing system for performing a power conservation action within a building or among multiple buildings, the system comprising:
   at least one processor;
   memory coupled to the at least one processor, wherein the memory stores contents that, when executed by the at least one processor performs a method of:
      receiving information related to data processing operations,
         wherein the information related to data processing operations comprises information related to power consumption forecast information, and information related to delayed storage operations at one or more data storage resources or available windows for delaying storage operations;
      receiving power consumption information related to at least one data processing component in the building;
      identifying one or more power conservation actions to be performed,
         wherein the power conservation actions to be performed are based on the information related to data processing operations and the power consumption information;
      selecting one or more of the identified power conservation actions based on the power consumption information and the information related to data processing operations; and
      signaling a change in a state of the computing system by performance of the selected one or more of the identified power conservation actions,
         wherein at least one of the power conservation actions includes adjusting the usage of electrical components within a building.

* * * * *